US012798126B2

(12) United States Patent
Tajima

(10) Patent No.: US 12,798,126 B2
(45) Date of Patent: Nov. 17, 2026

(54) COVERING MEMBER FIXING STRUCTURE, MACHINE, AND ROBOT

(71) Applicant: Fanuc Corporation, Yamanashi (JP)

(72) Inventor: Yuuki Tajima, Minamitsuru (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/700,419

(22) PCT Filed: Oct. 22, 2021

(86) PCT No.: PCT/JP2021/039148
§ 371 (c)(1),
(2) Date: Apr. 11, 2024

(87) PCT Pub. No.: WO2023/067812
PCT Pub. Date: Apr. 27, 2023

(65) Prior Publication Data
US 2025/0229441 A1 Jul. 17, 2025

(51) Int. Cl.
*B25J 18/00* (2006.01)

(52) U.S. Cl.
CPC .................................... *B25J 18/00* (2013.01)

(58) Field of Classification Search
CPC .... B25J 18/00; B25J 19/0075; B25J 19/0083; B25J 19/0025; B25J 19/0029
USPC ............. 74/490.01; 174/212, 158 R, 138 H, 174/138 R, 124 R, 5 SB, 5 R; 428/99, 428/100; 150/154; 206/231, 316.1, 341, 206/363, 438, 440, 446, 572, 570, 822; 128/846, 849, 852, 855, 856
See application file for complete search history.

(56) References Cited

U.S. PATENT DOCUMENTS 4,799,779 A * 1/1989 Mesmer ................. A61B 46/10 206/316.1
5,375,480 A 12/1994 Nihei
5,452,973 A * 9/1995 Arvin ..................... B61D 45/00 410/117
6,451,405 B1 * 9/2002 Diemer ................. F16N 31/006 296/38

(Continued)

FOREIGN PATENT DOCUMENTS

DE 202004006813 U1 * 7/2004 .............. B25J 21/00
JP H0577194 A 3/1993

(Continued)

OTHER PUBLICATIONS

International Search Report (PCT/ISA/210) with translation and Written Opinion (PCT/ISA/237) mailed Dec. 28, 2021, by the Japan Patent Office as the International Searching Authority for International Application No. PCT/JP2021/039148. (9 pages).

*Primary Examiner* — T. Scott Fix
(74) *Attorney, Agent, or Firm* — BUCHANAN INGERSOLL & ROONEY PC

(57) ABSTRACT

A covering member fixing structure includes a covering member that covers a linear body which is laid on a machine and a fixing member that fixes the covering member to the machine in at least one of a one-side region and another-side region in a virtual plane that contains a second axial-line of the machine on which the linear body is laid. The second axial line is parallel to a first axial line of the machine on which the linear body bends.

12 Claims, 18 Drawing Sheets

(56) References Cited

U.S. PATENT DOCUMENTS

| | | | | |
|---|---|---|---|---|
| 6,799,337 | B1 * | 10/2004 | Raphael-Davis | A47D 7/00 5/663 |
| 6,953,064 | B2 * | 10/2005 | Golz | D03D 25/00 139/383 R |
| 2004/0187989 | A1 * | 9/2004 | D'Andreta | B25J 19/0075 150/154 |
| 2004/0258877 | A1 * | 12/2004 | D'Andreta | B05B 15/50 428/99 |
| 2015/0202009 | A1 * | 7/2015 | Nussbaumer | A61B 46/10 128/856 |
| 2017/0072573 | A1 | 3/2017 | Motokado et al. | |
| 2019/0160688 | A1 | 5/2019 | Fujita | |

FOREIGN PATENT DOCUMENTS

| | | | | |
|---|---|---|---|---|
| JP | H05138581 | A | 6/1993 | |
| JP | H05301194 | A | 11/1993 | |
| JP | 2017056501 | A | 3/2017 | |
| JP | 2019098407 | A | 6/2019 | |
| WO | WO-9732534 | A1 * | 9/1997 | A61B 1/00126 |
| WO | 2020013931 | A1 | 1/2020 | |

* cited by examiner

COVERING MEMBER FIXING STRUCTURE, MACHINE, AND ROBOT

CROSS REFERENCE TO RELATED APPLICATIONS

This is the U.S. National Phase application of PCT/JP2021/039148, filed Oct. 22, 2021, the disclosure of this application being incorporated herein by reference in its entirety for all purposes.

FIELD OF THE INVENTION

The present invention relates to a covering member affixation technology, and in particular, relates to a covering member affixation structure, a machine, and a robot.

BACKGROUND OF THE INVENTION

Structures in which a umbilical member such as a cable or tube is laid inside a hollow housing of a machine such as an industrial robot are known. However, in locations where the movement of the umbilical member is restricted when the machine operates, the umbilical member may be exposed to the outside of the hollow housing. The exposed part of the umbilical member is often covered with a flexible covering member such as a cylindrical cloth cover or a rubber tube. The covering member serves the role of bundling a plurality of umbilical members or protecting the umbilical members from foreign substances such as spatter and swarf. The covering member is affixed to the machine by a ring-shaped affixation member such as a cable tie, string, belt, or a safety pin.

The umbilical member bends and/or twists as the machine moves. When the umbilical member bends or when the umbilical member bends and twists, it may come into contact with the affixation member for affixation of the covering member, and the affixation member may inhibit the movement of the umbilical member. If the umbilical member comes into sliding contact with the affixation member every time the umbilical member repeats bending or every time the umbilical member repeats bending and twisting, there is a risk that the umbilical member will prematurely be damaged. As technologies related to the present disclosure, the following literature is known.

Patent Literature 1 (WO 2020/016931) describes an articulated robot arm, comprising a cable protection member including a first flexible strip plate curving below the cable, a second flexible strip plate located above the cable with one end affixed and the other end free, and a cylindrical protective cover that wraps the cable, the first strip plate, and the second strip plate.

Patent Literature 2 (Japanese Unexamined Patent Publication (Kokai) No. 5-301194) describes an industrial robot, comprising a cable management arm for managing cables in the interior thereof, wherein a cable bundle is held in the interior thereof by a cable holder.

Patent Literature 3 (Japanese Unexamined Patent Publication (Kokai) No. 5-138581) describes an industrial articulated robot, wherein several locations in a middle of a cable unit are covered with a bendable protective tube to prevent damage from contact with a cable duct, and the ends of the protective tube are interposed between a clamping part and a cover.

PATENT LITERATURE

[PTL 1] WO 2020/016931
[PTL 2] Japanese Unexamined Patent Publication (Kokai) No. 5-301194
[PTL 3] Japanese Unexamined Patent Publication (Kokai) No. 5-138581

SUMMARY OF THE INVENTION

In light of the problems of the prior art, an object of the present application is to provide a covering member affixation technology which does not inhibit movement of a umbilical member and which prevents premature breakage of the umbilical member.

An aspect of the present disclosure provides a covering member affixation structure, comprising a covering member for covering a umbilical member laid in a machine, and an affixation member for affixing the covering member to the machine in at least one region of one side region and another side region of a virtual plane which is parallel to a first axis line of the machine where the umbilical member bends and which includes a second axis line of the machine along which the umbilical member is laid.

Another aspect of the present disclosure provides a machine or robot comprising the covering member affixation structure described above.

According to an aspect of the present disclosure, the affixation member is parallel to the first axis line of the machine where the umbilical member bends, and does not straddle (does not cross) one side region and another side region of the virtual plane including the second axis line of the machine where the umbilical member is laid. Thus, even if the umbilical member bends in accordance with movement of the machine along the first axis line, or even if the umbilical member bends and twists in accordance with movement of the machine along the first axis line and the second axis line, the umbilical member does not come into contact with the affixation member. Furthermore, since the affixation member does not inhibit the movement of the umbilical member, and the umbilical member does not come into sliding contact with the affixation member, premature breakage of the umbilical member can be suppressed, whereby the life of the umbilical member can be extended.

According to another aspect of the present disclosure, due to the covering member affixation structure described above, there can be provided a machine or robot which does not inhibit movement of the umbilical member and which suppresses premature damage to the umbilical member.

DETAILED DESCRIPTION OF EMBODIMENTS OF THE INVENTION

Figure 1:
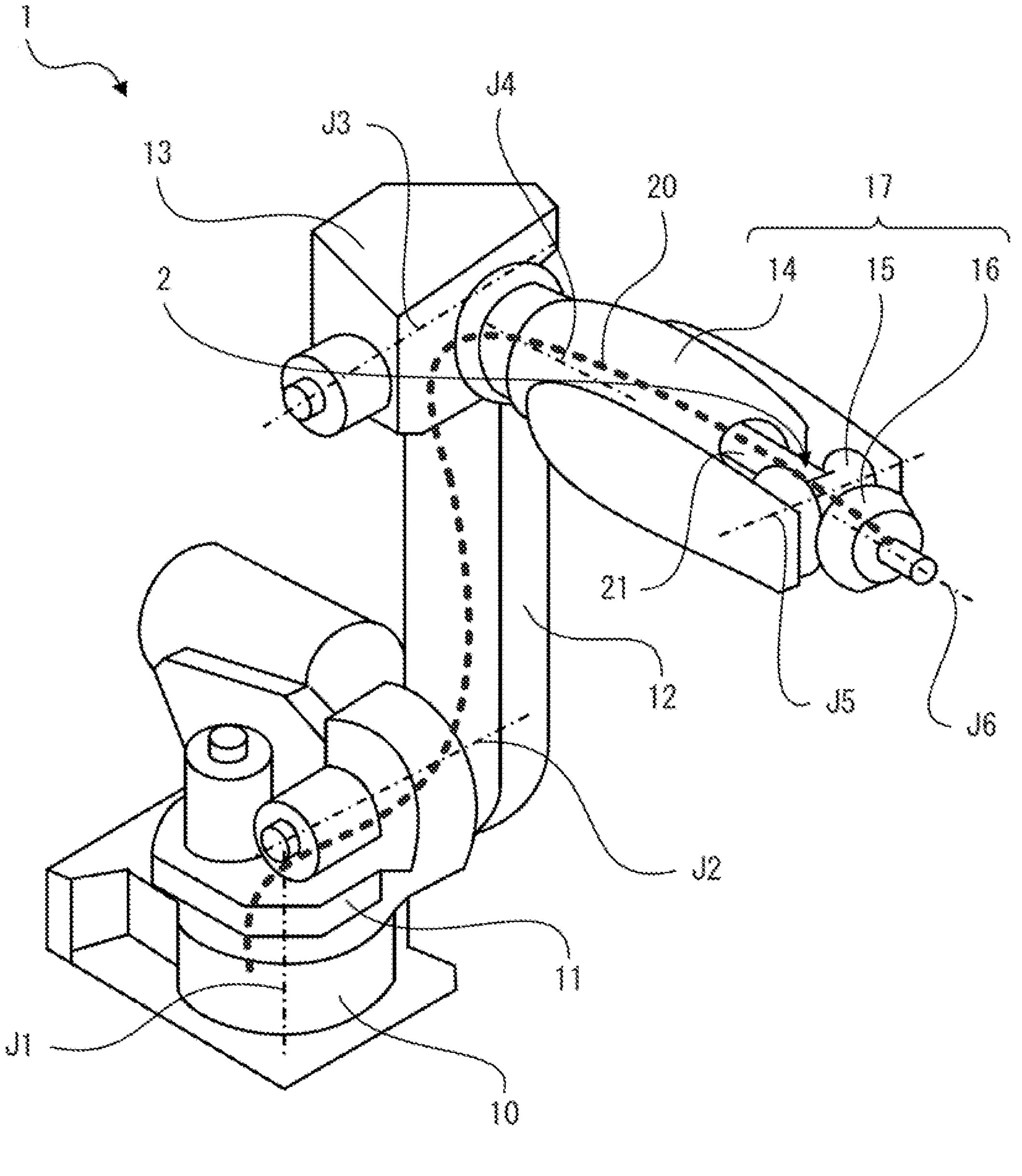
FIG. 1 is a perspective view of a machine comprising a covering member affixation structure of an embodiment.

The embodiments of the present disclosure will be described in detail below with reference to the attached drawings. In the drawings, identical or corresponding constituent elements have been assigned the same or corresponding reference signs. Furthermore, the embodiments described below do not limit the technical scope of the invention or the definitions of the terms described in the claims.

FIG. 1 is a perspective view of a machine 1 comprising a covering member affixation structure 2 according to an embodiment. Though the machine 1 in the present embodiment is an industrial robot, it should be noted that the machine 1 is not limited thereto, and in other embodiments, the machine 1 may be configured as another robot such as a dual-arm robot or a humanoid. It should also be noted that in other embodiments, the machine 1 may be configured as another machine such as a vehicle, an aircraft, a construction machine, or an agricultural machine.

The machine 1 of the present embodiment comprises a base 10 and a rotating trunk 11 which is supported so as to be rotatable relative to the base 10 about a first axis line J1. The machine 1 comprises a first arm 12 which is supported so as to be rotatable relative to the rotating trunk 11 about a second axis line J2 perpendicular to the first axis line J1, a second arm 13 which is supported so as to be rotatable relative to the first arm 12 about a third axis line J3 parallel to the second axis line J2, and a three-axis wrist unit 17 which is attached to the tip of the second arm 13. Though not illustrated, the machine 1 may further comprise a tool attached to the tip of the wrist unit 17. For example, the tool includes a hand, a welding tool, or a sealing tool.

The wrist unit 17 comprises a first wrist element 14 which is supported so as to be rotatable relative to the second arm 13 about a fourth axis line J4 perpendicular to the third axis line J3, and a second wrist element 15 which is supported so as to be rotatable relative to the first wrist element 14 about a fifth axis line J5 perpendicular to the fourth axis line J4. The wrist unit 17 further comprises a third wrist element 16 which is supported so as to be rotatable relative to the second wrist element 15 about a sixth axis line J6 perpendicular to the fifth axis line J5.

In this manner, the machine 1 comprises a plurality of links 10 to 16 which are connected to each other so as to be movable relative to each other. Though the machine 1 comprises joints which rotate about the predetermined axis lines J1 to J6 between the plurality of links 10 to 16, it is not limited thereto, and may also comprise joints which move linearly along the predetermined axis lines between the plurality of links 10 to 16. The machine 1 comprises actuators (not illustrated) for driving the respective links 11 to 16 at the joints. Each actuator comprises an electric motor, a speed reducer, etc.

Umbilical members 20 such as cables and tubes are laid on the links 10 to 16 to supply power and signals to the actuators and the tool attached to the hand. Though the links 10 to 16 are hollow housings, and the umbilical members 20 are laid inside the links 10 to 16, they are not limited thereto, and in other embodiments, at least one of the links 10 to 16 may not be a hollow housing, and the umbilical members 20 may be laid outside the links 10 to 16.

In locations where the movement of the umbilical members 20 is inhibited when the links 11 to 16 rotate about the predetermined axis lines J1 to J6 (the wrist unit 17 in the present example), the umbilical members 20 are exposed to the outside of the links 11 to 16 (exposed to the outside between the fourth link 14 and the fifth link 15 in the present example). The exposed parts of the umbilical members 20 are covered by a covering member 21. The covering member 21 serves the role of bundling a plurality of the umbilical members together or protecting the umbilical members 20 from foreign substances such as spatter and swarf. The covering member 21 is affixed to the machine 1 (the fifth link 15, which is a hollow housing, in the present example) by an unillustrated affixation member (refer to FIG. 2). In this manner, the machine 1 comprises the covering member affixation structure 2 for affixation of the covering member 21.

Figure 2:
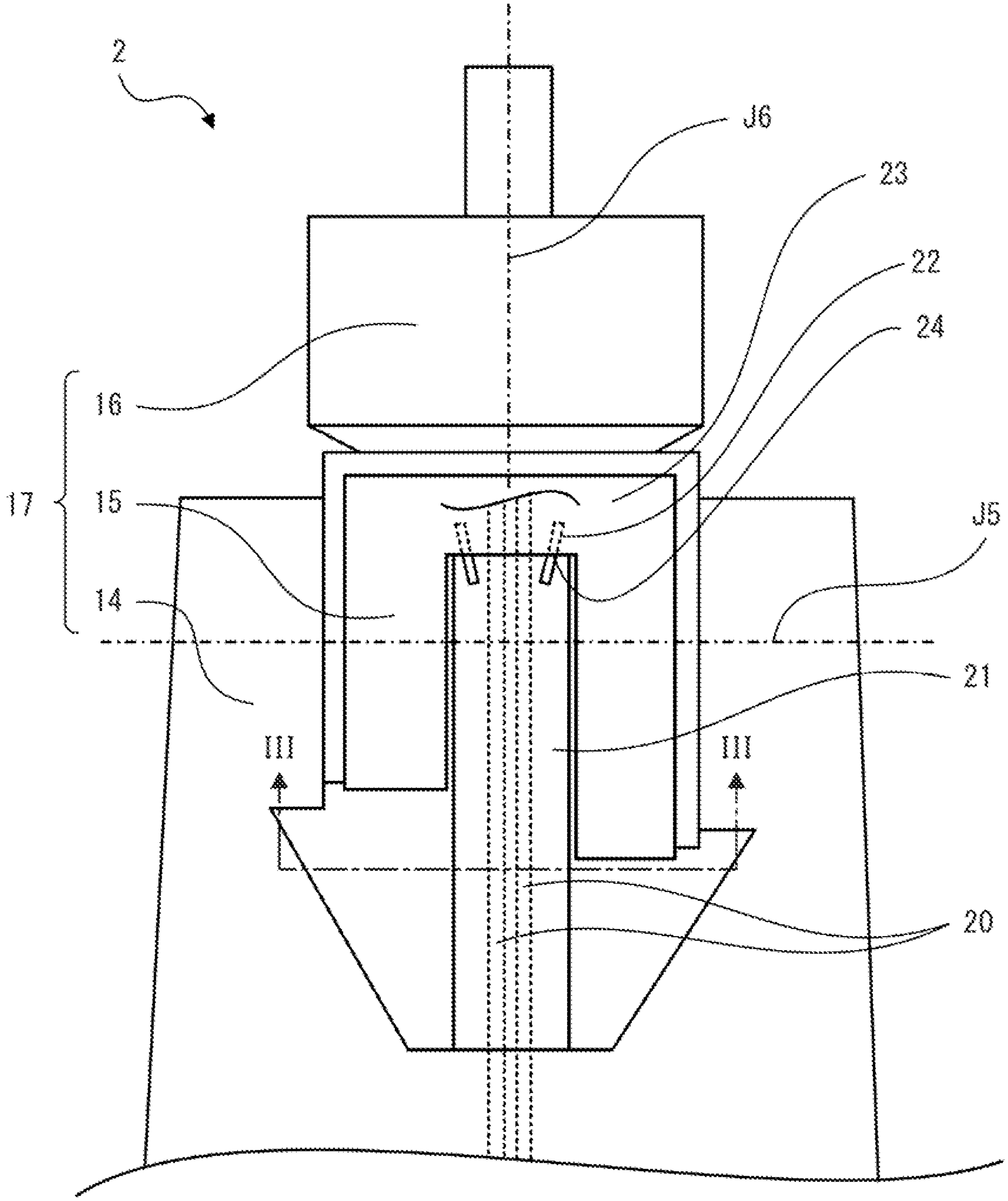
FIG. 2 is a top view of the covering member affixation structure of a first embodiment.

The covering member affixation structure 2 of the first embodiment will be described below. FIG. 2 is a top view of the covering member affixation structure 2 of the first embodiment. Though the covering member affixation structure 2 of the first embodiment is an affixation structure of the covering member 21 for covering the umbilical member umbilical member 20 laid on the wrist unit 17, it is not limited thereto, and as will be explained in the embodiment described below, the covering member affixation structure 2 may be an affixation structure of the covering member 21 for covering the umbilical member umbilical member 20 laid on other links 11 to 13 (the rotating trunk 11, first arm 12, and second arm 13). The covering member affixation structure 2 comprises the covering member 21 for covering the umbilical member umbilical member 20 exposed to the outside from the fourth link 14 and entering the inside of the fifth link 15, and an affixation member 22 for affixation of the covering member 21 to an affixed member 23.

Note that though the covering member 21 is a tubular cover composed of fabric, it is not limited thereto, and in other embodiments, the covering member 21 may be composed of other flexible covering members such as rubber tubing. Furthermore, though the covering member 21 covers only the exposed part of the umbilical member 20 between the fourth link 14 and the fifth link 15, it is not limited thereto, and in other embodiments, the covering member 21 may cover the umbilical member 20 laid inside the fourth link 14 or the fifth link 15, as long as the movement of the umbilical member 20 is not restricted thereby.

Though the affixation member 22 is a ring-shaped affixation member such as a cable tie, in other embodiments, the affixation member 22 may be another ring-shaped affixation member such as a string, a belt, or a safety pin. Furthermore, though the covering member 21 and the affixation member 22 are configured as separate members, they are not limited thereto, and in other embodiments, the covering member 21 and the affixation member 22 may be configured as a single integrated member.

The covering member affixation structure 2 may further comprise an affixed member 23 to which the affixation member 22 is affixed. Note that though the affixed member 23 is a protective cover for the fifth link 15, it is not limited thereto, and in other embodiments in which no protective cover is attached, the affixed member 23 may be composed of the cast fifth link 15 itself. Though the affixed member 23 is a flexible protective cover such as a resin cover having a smooth surface, it is not limited thereto, and in other embodiments, the affixed member 23 may be composed of a flexible protective cover such as a lightweight metal cover having a smooth surface. The affixed member 23 comprises a pair of through holes 24 (refer to FIG. 3) through which the ring-shaped affixation member 22 passes.

Figure 3:
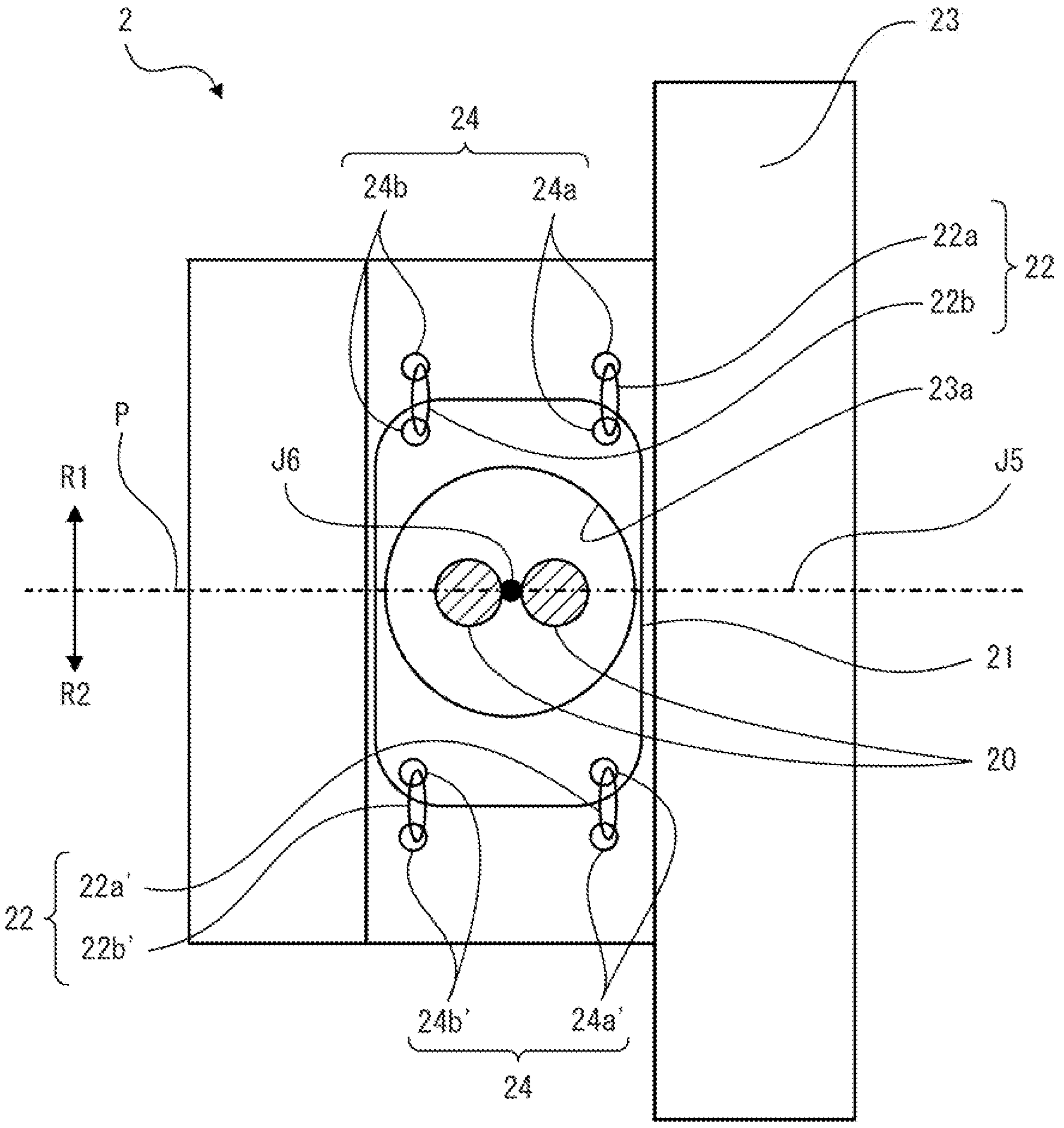
FIG. 3 is a cross-sectional view taken along line III-III showing details of the covering member affixation structure of the first embodiment.

FIG. 3 is a cross-sectional view taken along line III-III showing details of the covering member affixation structure 2 of the first embodiment. The covering member affixation structure 2 of the first embodiment comprises the covering member 21 for covering the umbilical member 20, and four affixation members 22*a*, 22*b*, 22*a*', and 22*b*' for affixation of the covering member 21 to an affixed member 23. The covering member affixation structure 2 may further comprise an affixed member 23 to which the covering member 21 is affixed. The affixed member 23 comprises four pairs of through holes 24*a*, 24*b*, 24*a*', and 24*b*'. The virtual plane P is a plane parallel to the fifth axis line J5 of the machine 1 on which the umbilical member 20 bends and includes the sixth axis line J6 of the machine 1 on which the umbilical member 20 is laid. Further, the fifth axis line J5 is the axis of rotation of the fifth link 15, and the sixth axis line J6 is the axis of rotation of the sixth link 16. The sixth axis line J6 is also the center axis line of the hollow hole 23*a* of the affixed member 23 (or the fifth link 15, which is a hollow housing) through which the umbilical member 20 is inserted. The affixation members 22*a*, 22*b*, 22*a*', and 22*b*' pass through the pairs of through holes 24*a*, 24*b*, 24*a*', and 24*b*' to affix the covering member 21 to the affixed member 23.

Specifically, the first affixation member 22*a* passes through the first pair of through holes 24*a* in one side region R1 of the virtual plane P to affix the covering member 21. The second affixation member 22*b* passes through the second pair of through holes 24*b* in the one side region R1 of the virtual plane P to affix the covering member 21. The third affixation member 22*a*' passes through the third pair of through holes 24*a*' in the other side region R2 of the virtual plane P to affix the covering member 21. The fourth affixation member 22*b*' passes through the fourth pair of through holes 24*b*' in the other side region R2 of the virtual plane P to affix the covering member 21. The four affixation members 22*a*, 22*b*, 22*a*', 22*b*' and the four pairs of through holes 24*a*, 24*b*, 24*a*', 24*b*' are arranged at predetermined intervals around the cylindrical covering member 21.

Figure 4A:
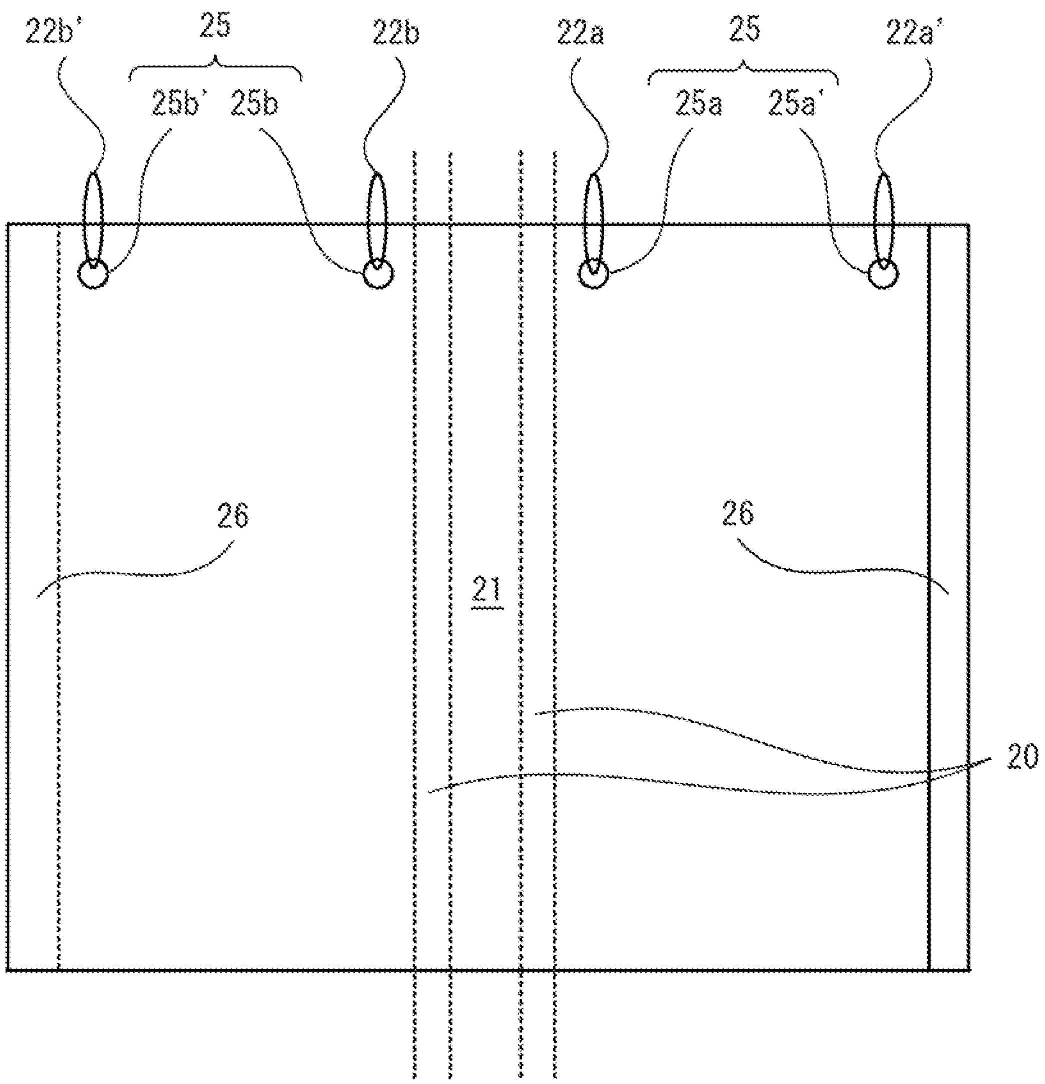
FIG. 4A is a developed view of the covering member of the first embodiment.

FIG. 4A is a developed view of the covering member 21 of the first embodiment. The covering member 21 of the present example is a substantially rectangular cover that unfolds into a sheet-like shape. The covering member 21 comprises a pair of joints 26 on the two sides substantially parallel to the direction of extension of the umbilical member 20. One joint 26 is arranged on the front side of the covering member 21, and the other joint 26 is arranged on the back side of the covering member 21. Note that though the joint 26 is a hook-and-loop fastener, it is not limited thereto, and in other embodiments, the joint 26 may be constituted by a zipper or a button. By rolling the covering member 21 into a cylindrical shape, wrapping it around the umbilical member 20, and joining the pair of joints 26, the covering member 21 covers the umbilical member 20.

The covering member 21 comprises insertion holes 25 for the affixation member 22 at the end substantially perpendicular to the direction of extension of the umbilical member 20. More specifically, the covering member 21 of the present example comprises four insertion holes 25*a*, 25*b*, 25*a*', and 25*b*' arranged at the end substantially perpendicular to the direction of extension of the umbilical member 20. The affixation members 22*a*, 22*b*, 22*a*', 22*b*' are inserted into the insertion holes 25*a*, 25*b*, 25*a*', 25*b*', respectively, in a direction substantially parallel to the direction of extension of the umbilical member 20.

Specifically, the first affixation member 22*a* is inserted into the first insertion hole 25*a* in the one side region R1 of the virtual plane P (refer to FIG. 3) to affix the covering member 21. The second affixation member 22*b* is inserted into the second insertion hole 25*b* in the one side region R1 of the virtual plane P (refer to FIG. 3) to affix the covering member 21. The third affixation member 22*a*' is inserted into the third insertion hole 25*a*' in the other side region R2 of the virtual plane P (refer to FIG. 3) to affix the covering member 21. The fourth affixation member 22*b*' is inserted into the fourth insertion hole 25*b*' in the other side region R2 of the virtual plane P (refer to FIG. 3) to affix the covering member 21. The four insertion holes 25*a*, 25*b*, 25*a*', 25*b*' and the four affixation members 22*a*, 22*b*, 22*a*', 22*b*' are arranged at predetermined intervals at the end of the covering member 21.

Referring again to FIG. 3, the first affixation member 22*a* and the second affixation member 22*b* affix the covering member 21 to the affixed member 23 in one side region R1 of the virtual plane P. Further, the third affixation member 22*a*' and the fourth affixation member 22*b*' affix the covering member 21 to the affixed member 23 in the other side region R2 of the virtual plane P. In this manner, the affixation member 22 affixes the covering member 21 to the machine 1 in at least one of the one side region R1 and the other side region R2 of the virtual plane P. In particular, the affixation member 22 affixes the covering member 21 to the machine 1 on the radially outer side of the hollow hole 23*a* of the affixed member 23 (or the fifth link 15, which is a hollow housing). Thus, even if the umbilical member 20 bends about the fifth axis line J5 in accordance with rotation of the fifth link 15 shown in FIG. 2 about the fifth axis line J5, or even if the umbilical member 20 bends about the fifth axis line J5 and twists about the sixth axis line J6 in accordance with rotation of the fifth link 15 shown in FIG. 2 about the fifth axis line J5 and rotation of the sixth link 16 about the sixth axis line J6, the umbilical member 20 does not contact the affixation member 22. Further, since the affixation member 22 does not inhibit movement of the umbilical member 20 and the umbilical member 20 does not come into sliding contact with the affixation member 22, premature breakage of the umbilical member 20 can be suppressed, whereby the life of the umbilical member 20 can be extended.

In contrast, in the case in which the distance between the umbilical member 20 and the fifth link 15 is short, when the affixation member 22 straddles (crosses) the one side region R1 and the other side region R2 of the virtual plane P, the umbilical member 20 becomes more likely to come into contact with the affixation member 22. In particular, when the machine 1 is a robot, since it is necessary to house the actuators (electric motors, reducers, gears, etc.) of the fifth link 15 and the sixth link 16 and the umbilical member 20 in a limited space, it becomes more likely that the umbilical member 20 will come into contact with the affixation member 22. Thus, when the umbilical member 20 bends in accordance with rotation of the fifth link 15 about the fifth axis line J5, or when the umbilical member bends about the fifth axis line J5 and twists about the sixth axis line J6 in accordance with rotation of the fifth link 15 about the fifth axis line J5 and rotation of the sixth link 16 about the sixth axis line J6, the umbilical member comes into contact with the affixation member 22. As a result, the affixation member 22 inhibits movement of the umbilical member 20. Furthermore, since the umbilical member 20 comes into sliding contact with the affixation member 22 each time the umbilical member 20 repeats bending or each time the umbilical member 20 repeats bending and twisting, there is a risk that the umbilical member 20 will be prematurely damaged.

Referring again to FIG. 2, when the umbilical member 20 bends or when the umbilical member 20 bends and twists in accordance with the operations of the machine 1 described above, the covering member 21 is pulled by the umbilical member 20 and may move in a direction away from the affixed member 23. It is preferable that the covering member 21 comprise reinforcement parts (not illustrated) so that the covering member 21 is not torn by the affixation member 22 when the covering member 21 moves away from the affixed member 23. Though the reinforcement parts are constructed by laminating a plurality of sheets of cloth or rubber at the end where the insertion holes 25 shown in FIG. 4A are formed, they are not limited thereto, and in other embodiments, the reinforcement parts may be constituted by metal fittings such as eyelets for reinforcing the peripheries of the insertion holes 25. In another embodiment, the reinforcement parts may be constituted by combining these laminated reinforcements and metal reinforcements.

Figure 4B:
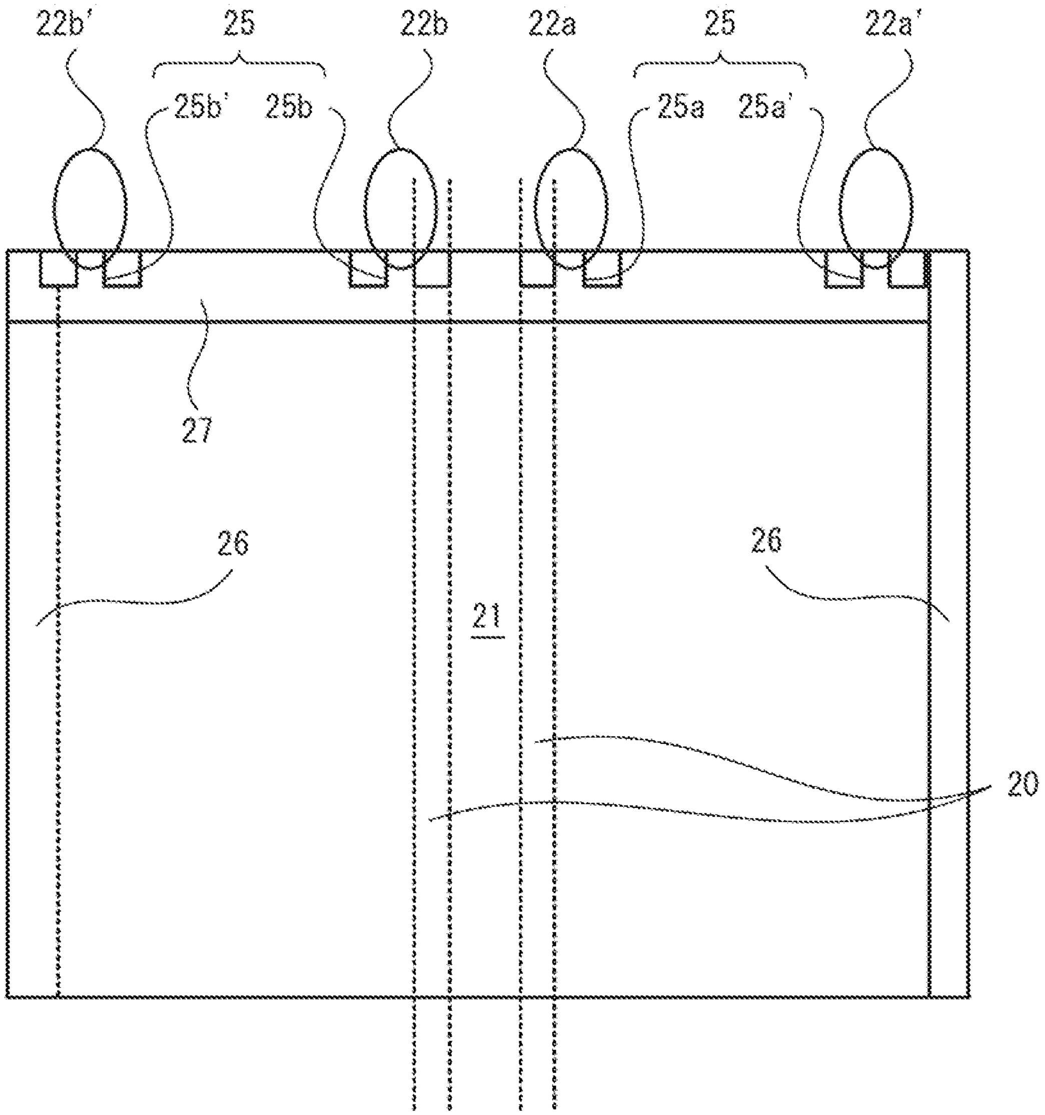
FIG. 4B is a developed view of a covering member of a modification example.

FIG. 4B is a developed view of the covering member 21 of a modification example. The covering member 21 of the modification example differs from the covering member 21 shown in FIG. 4A in that it comprises a cylindrical part 27 which is formed into a cylindrical shape by folding back the end substantially perpendicular to the direction of extension of the umbilical member 20, and an insertion hole 25 having a predetermined width formed between two notches after cutting two pieces from the cylindrical part 27. More specifically, the covering member 21 of the modification example has four insertion holes 25*a*, 25*b*, 25*a*', 25*b*' of a predetermined width formed between two adjacent notches after cutting out eight pieces from the cylindrical part 27. The affixation members 22*a*, 22*b*, 22*a*', 22*b*' are inserted into the insertion holes 25*a*, 25*b*, 25*a*', 25*b*', respectively in a direction substantially perpendicular to the direction of extension of the umbilical member 20.

Specifically, the first affixation member 22*a* is inserted into the first insertion hole 25*a* in the one side region R1 of the virtual plane P (refer to FIG. 3) to affix the covering member 21. The second affixation member 22*b* is inserted into the second insertion hole 25*b* in the one side region R1 of the virtual plane P (refer to FIG. 3) to affix the covering member 21. The third affixation member 22*a*' is inserted into the third insertion hole 25*a*' in the other side region R2 of the virtual plane P (refer to FIG. 3) to affix the covering member 21. The fourth affixation member 22*b*' is inserted into the fourth insertion hole 25*b*' in the other side region R2 of the virtual plane P (refer to FIG. 3) to affix the covering member 21. The four insertion holes 25*a*, 25*b*, 25*a*', 25*b*' and the four affixation members 22*a*, 22*b*, 22*a*', 22*b*' are arranged at predetermined intervals at the end of the covering member 21.

Even if the covering member 21 of the modification example is pulled downward direction in the drawings due to bending of the umbilical member 20 or bending and twisting of the umbilical member 20, since the affixation member 22 receives the tensile force of the covering member 21 in a line through the insertion holes 25 having a predetermined width, the affixation member 22 is unlikely to break. Furthermore, there is an advantage in that the covering member 21 of the modification example is unlikely to fall off. In contrast, when the affixation member 22 receives the tensile force of the covering member 21 at one point from the insertion holes 25, the affixation member 22 is likely to break.

Moreover, it is preferable that the covering member 21 of the modification example comprise the reinforcement parts (not illustrated) described above. Though the reinforcement parts are constructed by laminating a plurality of sheets of cloth or rubber at the end where the insertion holes 25 shown in FIG. 4B are formed, they are not limited thereto, and in other embodiments, the reinforcement parts may be constituted by loop-shaped fittings for reinforcing the insertion holes 25 of a predetermined width. In another embodiment, the reinforcement parts may be constituted by combining these laminated reinforcements and metal reinforcements.

Figure 4C:
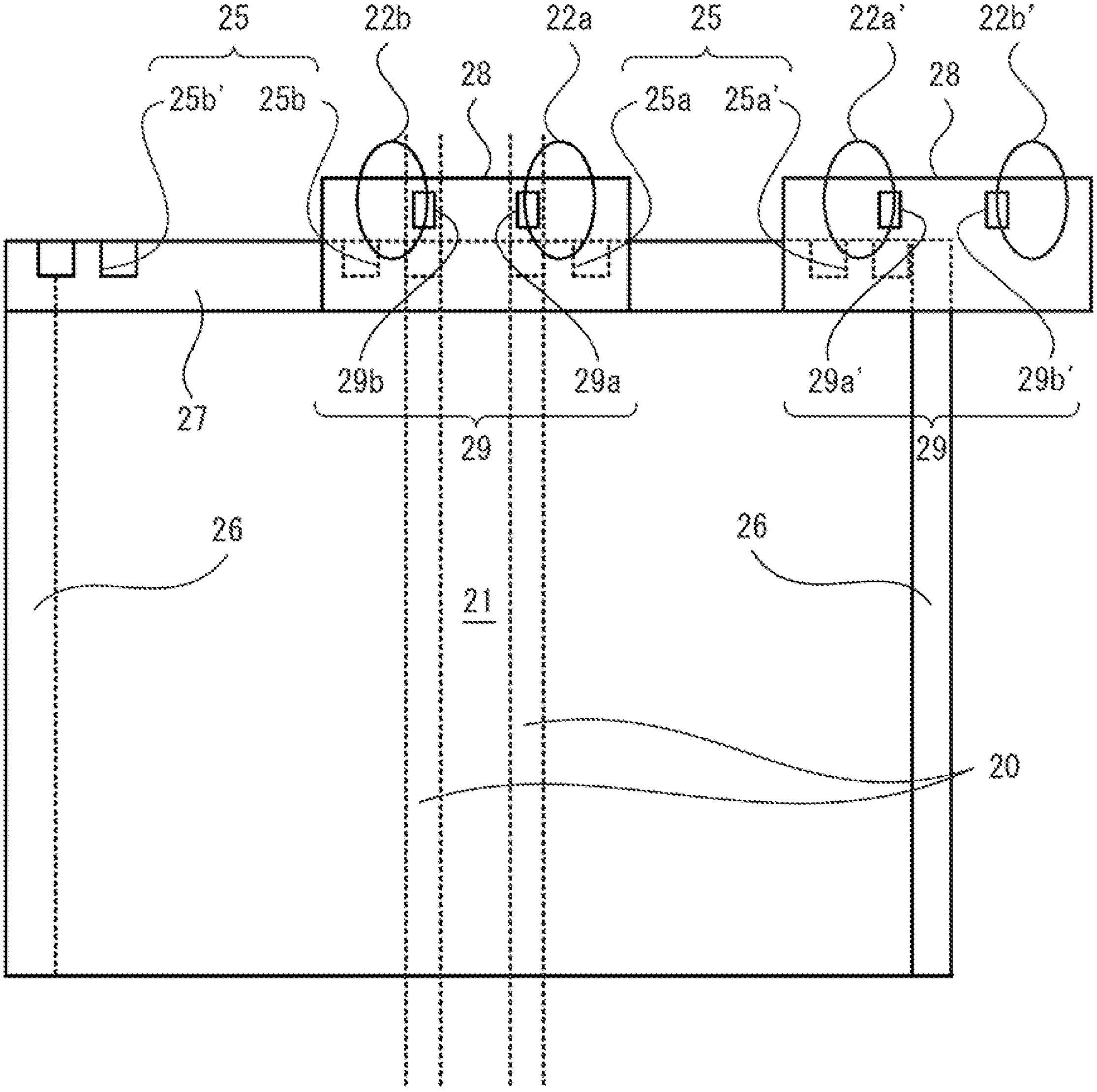
FIG. 4C is a developed view of a covering member of another modification example.

FIG. 4C is a developed view of the covering member 21 of another modification example. Though the covering member 21 of the other modification example has substantially the same configuration as the covering member 21 of the modification example shown in FIG. 4B, the covering member 21 of the other modification example differs from the covering member 21 of the modification example shown in FIG. 4B in that it comprises sub-covering parts 28. More specifically, the covering member 21 of the other modification example comprises two sub-covering parts 28 at the end where the insertion holes 25 are formed. Note that that in other embodiments, the covering member 21 of the other modification example may comprise one sub-covering part 28 at the end where the insertion holes 25 are formed. In this case, the one sub-covering part 28 preferably extends across the entire end where the insertion holes 25 are formed.

Though the sub-covering parts 28 are cloth such as patch cloth, they are not limited thereto, and in other embodiments, the sub-covering parts 28 may be composed of rubber such as patch rubber. The sub-covering parts 28 cover the insertion holes 25 and extend outward from the end where the insertion holes 25 are formed. More specifically, the first sub-covering part 28 covers the first set of insertion holes 25*a*, 25*b* and extends outward from the end where the first set of insertion holes 25*a*, 25*b* are formed. The second sub-covering part 28 covers the second set of insertion holes 25*a*', 25*b*' and extends outward from the end where the second set of insertion holes 25*a*', 25*b*' are formed.

Even if the covering member 21 of the other modification example is pulled downward in the drawing due to bending of the umbilical member 20 or bending and twisting of the umbilical member 20, since the sub-covering parts 28 cover the gap that may be formed between the covering member 21 and the affixed member 23 (refer to FIG. 2), the sub-covering parts 28 have the role of protecting the umbilical member 20 from foreign substances such as spatter and swarf regardless of the operation of the umbilical member 20.

Further, it is preferable that the sub-covering parts 28 have sub-insertion holes 29 more outward from the end where the insertion holes 25 are formed. More specifically, the first sub-covering part 28 includes a first set of sub-insertion holes 29*a*, 29*b*. The second sub-covering part 28 includes a second set of sub-insertion holes 29*a*', 29*b*'. The affixation members 22*a*, 22*b*, 22*a*', 22*b*' are inserted into the sub-insertion holes 29*a*, 29*b*, 29*a*', 29*b*', respectively, in a direction substantially parallel to the direction of extension of the umbilical member 20.

Specifically, the first affixation member 22*a* is inserted into the first insertion hole 25*a* and the first sub-insertion hole 29*a* in one side region R1 of the virtual plane P (refer to FIG. 3) to affix the covering member 21. The second affixation member 22*b* is inserted into the second insertion hole 25*b* and the second sub-insertion hole 29*b* in one side region R1 of the virtual plane P (refer to FIG. 3) to affix the covering member 21. The third affixation member 22*a*' is inserted into the third insertion hole 25*a*' and the third sub-insertion hole 29*a*' in the other side region R2 of the virtual plane P (refer to FIG. 3) to affix the covering member 21. The fourth affixation member 22*b*' is inserted into the fourth insertion hole 25*b*' and the fourth sub-insertion hole 29*b*' in the other side region R2 of the virtual plane P (refer to FIG. 3) to affix the covering member 21. The four insertion holes 25*a*, 25*b*, 25*a*', 25*b*', the four sub-insertion holes 29*a*, 29*b*, 29*a*', 29*b*', and the four affixation members 22*a*, 22*b*, 22*a*', 22*b*' are arranged at predetermined intervals at the end of the covering member 21.

In the covering member 21 of the other modification example, since the affixation members 22 are inserted through the insertion holes 25 and the sub-insertion holes 29 and affixed to the affixed member 23 (refer to FIG. 2), the sub-covering parts 28 and the end of the covering member 21 are jointly fastened to the affixed member 23. As a result, even if the umbilical member 20 bends or the umbilical member 20 bends and twists, since the sub-covering parts 28 do not roll up, the covering member 21 of the other modification has the advantage that the sub-covering parts 28 protect the umbilical member 20 from foreign substances such as spatter and swarf regardless of the operation of the umbilical member 20.

Figure 5:
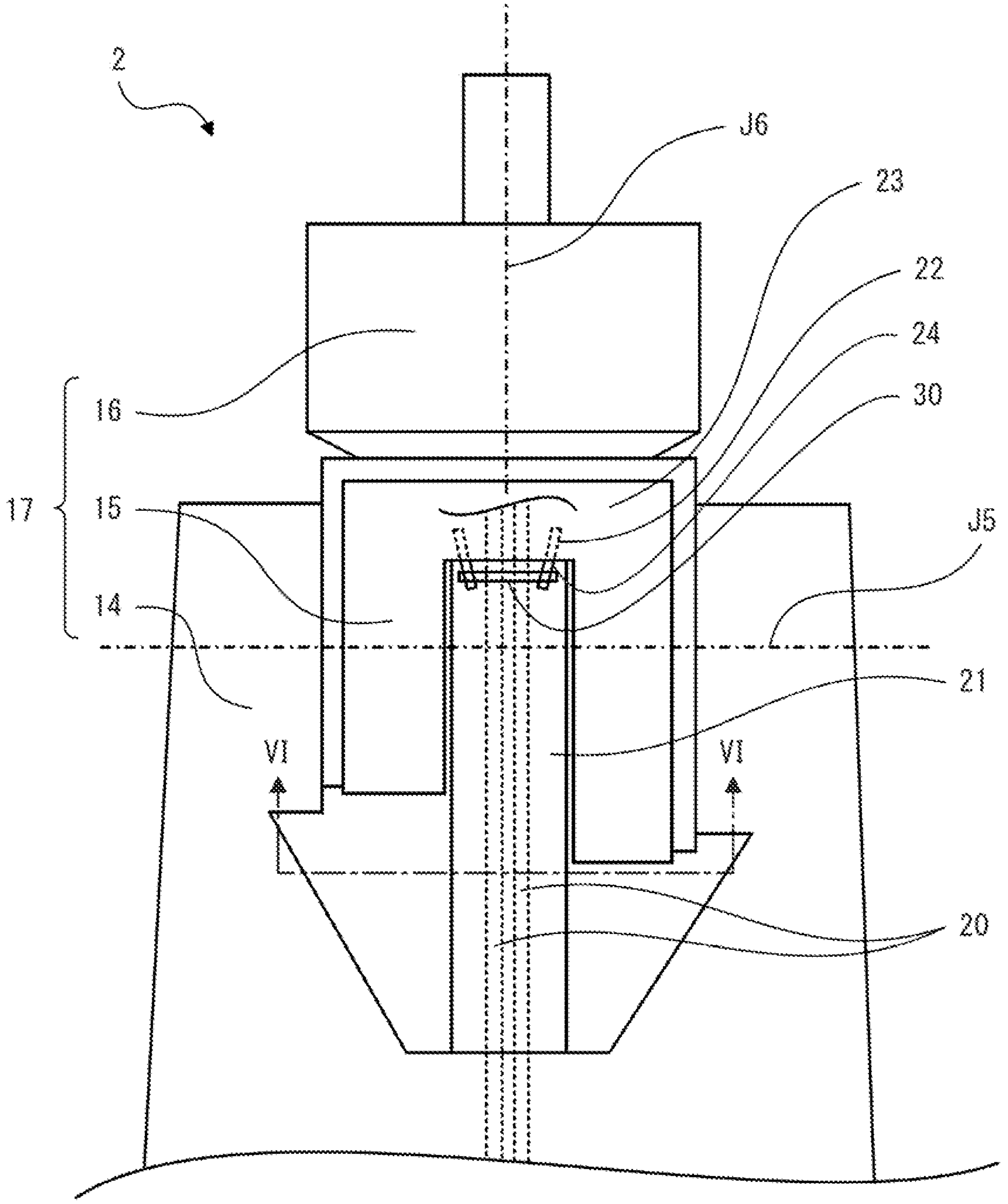
FIG. 5 is a top view of the covering member affixation structure of a second embodiment.

The covering member affixation structure 2 of a second embodiment will be described below. FIG. 5 is a top view of the covering member affixation structure 2 of the second embodiment. The covering member affixation structure 2 of the second embodiment differs from the covering member affixation structure 2 of the first embodiment in that it comprises a relay member 30 for relaying between the covering member 21 and the affixation member 22.

Though the relay member 30 is a ring-shaped relay member such as a cable tie, it is not limited thereto, and in other embodiments, the relay member 30 may be composed of another ring-shaped relay member such as a string, a belt, or a safety pin. Though the covering member 21 and the relay member 30 are configured as separate members, they are not limited thereto, and in other embodiments, the covering member 21 and the relay member 30 may be configured as a single integrated member.

Figure 6:
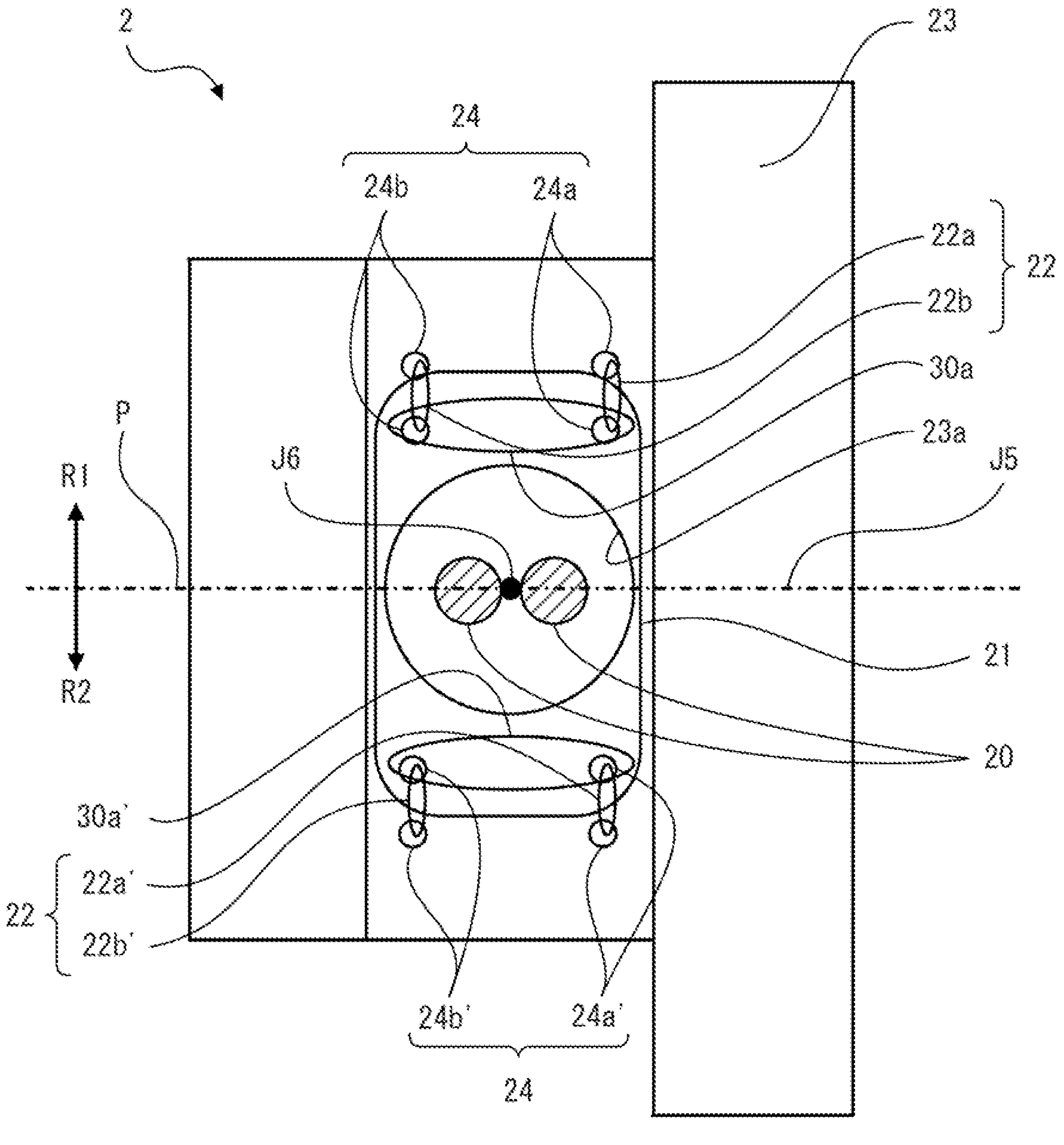
FIG. 6 is a cross-sectional view taken along line VI-VI showing details of the covering member affixation structure of the second embodiment.

FIG. 6 is a cross-sectional view taken along line VI-VI showing details of the covering member affixation structure 2 of the second embodiment. The covering member affixation structure 2 of the second embodiment comprises a covering member 21 covering the umbilical member 20, a first relay member 30*a* that relays between the covering member 21 and the first set of affixation members 22*a*, 22*b*, a second relay member 30*a*' that relays between the covering member 21 and the second set of affixation members 22*a*', 22*b*', two affixation members 22*a*, 22*b* for affixing the covering member 21 to the affixed member 23 via the first relay member 30*a*, and two affixation members 22*a*', 22*b*' for affixing the covering member 21 to the affixed member 23 via the second relay member 30*a*'.

Furthermore, the covering member affixation structure 2 may further comprise an affixed member 23 to which the covering member 21 is affixed. The affixed member 23 comprises four pairs of through holes 24*a*, 24*b*, 24*a*', and 24*b*' arranged on another virtual plane (not illustrated) substantially orthogonal to the virtual plane P. The virtual plane P is a plane parallel to the fifth axis line J5 of the machine 1 on which the umbilical member 20 bends and includes the sixth axis line J6 of the machine 1 on which the umbilical member 20 is laid. The fifth axis line J5 is the axis of rotation of the fifth link 15, and the sixth axis line J6 is the axis of rotation of the sixth link 16. The sixth axis line J6 is also the center axis line of the hollow hole 23*a* of the affixed member 23 (or fifth link 15 which is a hollow housing) through which the umbilical member 20 is inserted. The affixation members 22*a*, 22*b*, 22*a*', and 22*b*' penetrate through the pair of through holes 24*a*, 24*b*, 24*a*', and 24*b*' on the other virtual plane (not illustrated) approximately perpendicular to the virtual plane P to affix the covering member 21 to the affixed member 23.

Specifically, the first affixation member 22*a* passes through the first pair of through holes 24*a* via the first relay member 30*a* in the one side region R1 of the virtual plane P to affix the covering member 21. The second affixation member 22*b* passes through the second pair of through holes 24*b* via the first relay member 30*a* in the one side region R1 of the virtual plane P to affix the covering member 21. The third affixation member 22*a*' passes through the third pair of through holes 24*a*' in the other side region R2 of the virtual plane P via the second relay member 30*a*' to affix the covering member 21. The fourth affixation member 22*b*' passes through the fourth pair of through holes 24*b*' via the second relay member 30*a*' in the other side region R2 of the virtual plane P to affix the covering member 21. The two relay members 30*a*, 30*a*', the four affixation members 22*a*, 22*b*, 22*a*', 22*b*', and the four pairs of through holes 24*a*, 24*b*, 24*a*', 24*b*' are arranged at predetermined intervals around the cylindrical covering member 21.

Figure 7A:
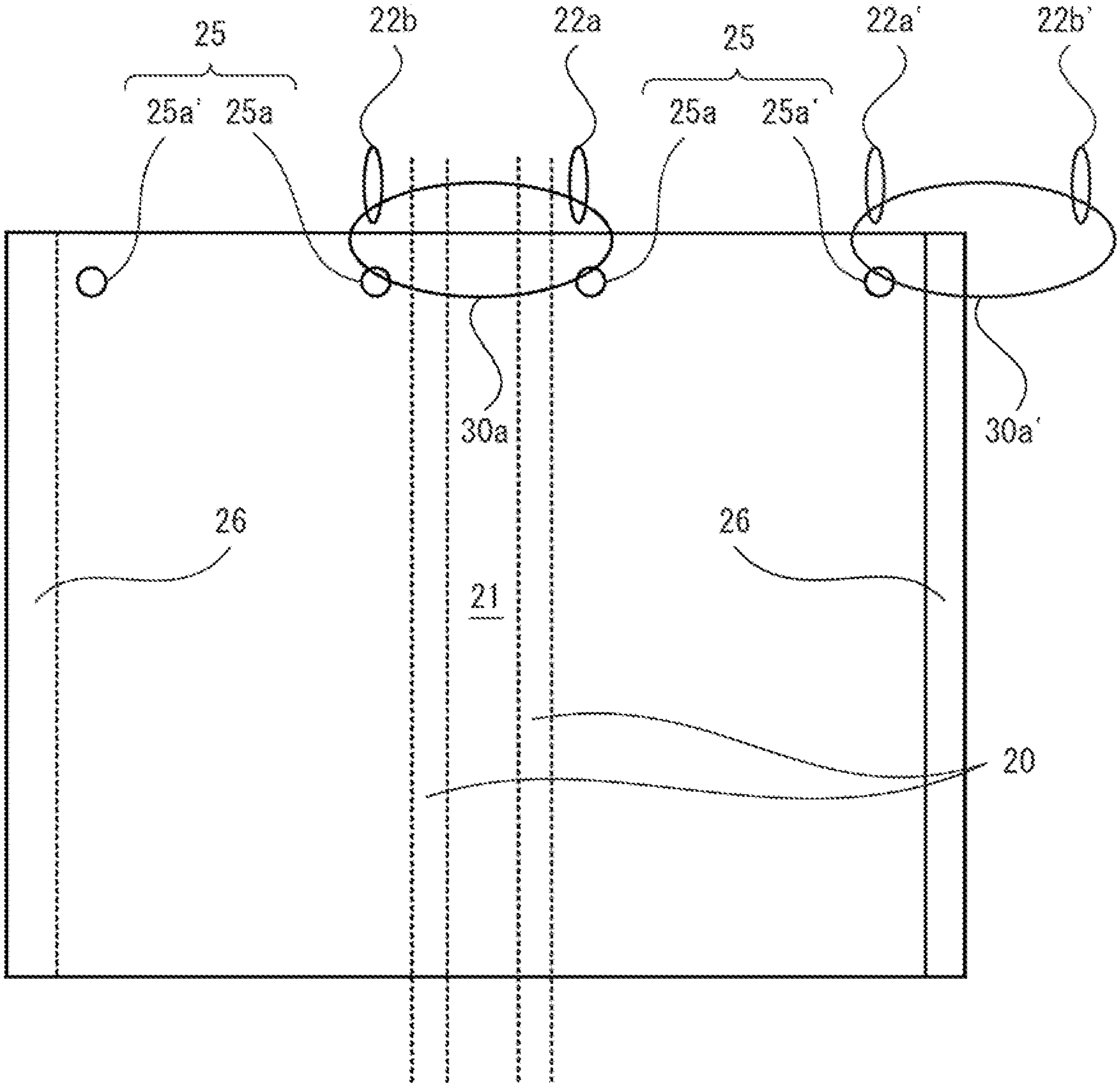
FIG. 7A is a developed view of the covering member of the second embodiment.

FIG. 7A is a developed view of the covering member 21 of the second embodiment. The covering member 21 of the present example is a substantially rectangular cover that unfolds into a sheet-like shape. The covering member 21 comprises a pair of joints 26 on the sides substantially parallel to the direction of extension of the umbilical member 20. One joint 26 is arranged on the front side of the covering member 21, and the other joint 26 is arranged on the back side of the covering member 21. Though the joints 26 are hook-and-loop fasteners, they are not limited thereto, and in other embodiments, the joints 26 may be constituted by a zipper or a button. By rolling the covering member 21 into a cylindrical shape, wrapping it around the umbilical member 20, and joining the pair of joints 26, the covering member 21 covers the umbilical member 20.

The covering member 21 comprises insertion holes 25 for the relay member 30 at the end substantially perpendicular to the direction of extension of the umbilical member 20. More specifically, the covering member 21 of the present example comprises two pairs of insertion holes 25*a*, 25*a*' arranged at the end substantially perpendicular to the direction of extension of the umbilical member 20. The relay members 30*a*, 30*a*' are inserted into the pair of insertion holes 25*a*, 25*a*', respectively, arranged in the direction substantially perpendicular to the direction of extension of the umbilical member 20.

Specifically, the first relay member 30*a* is inserted into the first pair of insertion holes 25*a*, and the first affixation member 22*a* and the second affixation member 22*b* are inserted into the first relay member 30*a* in the one side region R1 of the virtual plane P (refer to FIG. 6) to affix the covering member 21. The second relay member 30*b* is inserted into the second pair of insertion holes 25*a*', and the third affixation member 22*a*' and fourth affixation member 22*b*' are inserted into the second relay member 30*a*' in the other side region R2 of the virtual plane P (refer to FIG. 6) to affix the covering member 21. The two pairs of insertion holes 25*a*, 25*a*', the two relay members 30*a*, 30*a*', and the four affixation members 22*a*, 22*b*, 22*a*', 22*b*' are arranged at predetermined intervals at the end of the covering member 21.

Referring again to FIG. 6, the first affixation member 22*a* and the second affixation member 22*b* affix the covering member 21 to the affixed member 23 via the first relay member 30*a* in one side region R1 of the virtual plane P. Furthermore, the third affixation member 22*a*' and the fourth affixation member 22*b*' affix the covering member 21 to the affixed member 23 via the second relay member 30*a*' in the other side region R2 of the virtual plane P. In this manner, the affixation member 22 and the relay member 30 affix the covering member 21 to the machine 1 in at least one of the one side region R1 and the other side region R2 of the virtual plane P. In particular, the affixation member 22 and the relay member 30 affix the covering member 21 to the machine 1 on the radially outer side of the hollow hole 23*a* of the affixed member 23 (or the fifth link 15, which is a hollow housing). Thus, even if the umbilical member 20 bends about the fifth axis line J5 in accordance with rotation of the fifth link 15 shown in FIG. 5 about the fifth axis line J5, or the umbilical member 20 bends about the fifth axis line J5 and twists about the sixth axis line J6 in accordance with rotation of the fifth link 15 shown in FIG. 5 about the fifth axis line J5 and rotation of the sixth link 16 about the sixth axis line J6, the umbilical member 20 does not contact the affixation member 22 or the relay member 30. Furthermore, since the affixation member 22 and the relay member 30 do not inhibit movement of the umbilical member 20 and the umbilical member 20 does not come into sliding contact with the affixation member 22 and the relay member 30, premature breakage of the umbilical member 20 can be suppressed, whereby the life of the umbilical member 20 can be extended.

In contrast, in the case in which the distance between the umbilical member 20 and the fifth link 15 is short, when the affixation member 22 straddles (crosses) the one side region R1 and the other side region R2 of the virtual plane P, the umbilical member 20 becomes more likely to come into contact with the affixation member 22 or the relay member 30. In particular, when the machine 1 is a robot, since it is necessary to house the actuators (electric motors, reducers, gears, etc.) of the fifth link 15 and the sixth link 16 and umbilical member 20 in a limited space, the umbilical member 20 is more likely to come into contact with the affixation member 22 and the relay member 30. Thus, when the umbilical member 20 bends in accordance with the rotation of the fifth link 15 about the fifth axis line J5, or when the umbilical member 20 bends about the fifth axis line J5 and twists about the sixth axis line J6 in accordance with the rotation of the fifth link 15 about the fifth axis line J5 and rotation of the sixth link 16 about the sixth axis line J6, the umbilical member 20 contacts the affixation member 22 and the relay member 30. Furthermore, the affixation member 22 and the relay member 30 inhibit the movement of the umbilical member 20. Furthermore, since the umbilical member 20 comes into sliding contact with the affixation member 22 each time the umbilical member 20 repeats bending or each time the umbilical member 20 repeats bending and twisting, there is a risk that the umbilical member 20 will be prematurely damaged.

Referring again to FIG. 5, when the umbilical member 20 bends or when the umbilical member 20 bends and twists in accordance with the above operation of the machine 1, the covering member 21 may be pulled by the umbilical member 20 and move in a direction away from the affixed member 23. The covering member 21 preferably comprises reinforcement parts (not illustrated) so that the covering member 21 is not torn by the relay member 30 when the covering member 21 moves away from the affixed member 23. Though the reinforcement parts are constructed by laminating a plurality of sheets of cloth or rubber at the end where the insertion holes 25 shown in FIG. 7A are formed, they are not limited thereto, and in other embodiments, the reinforcement parts may be constituted by metal fittings such as eyelets for reinforcing the peripheries of the insertion holes 25. In another embodiment, the reinforcement parts may be constituted by combining these laminated reinforcements and metal reinforcements.

According to the covering member affixation structure 2 of the second embodiment, since the relay member 30 relays between the covering member 21 and the affixation member 22 without tightening the covering member 21, even if the affixation member 22 is tightened, the shape of the covering member 21 can be maintained. Specifically, the covering member affixation structure 2 of the second embodiment has the advantage in that the covering member 21 is not likely to inhibit the movement of the umbilical member 20.

Figure 7B:
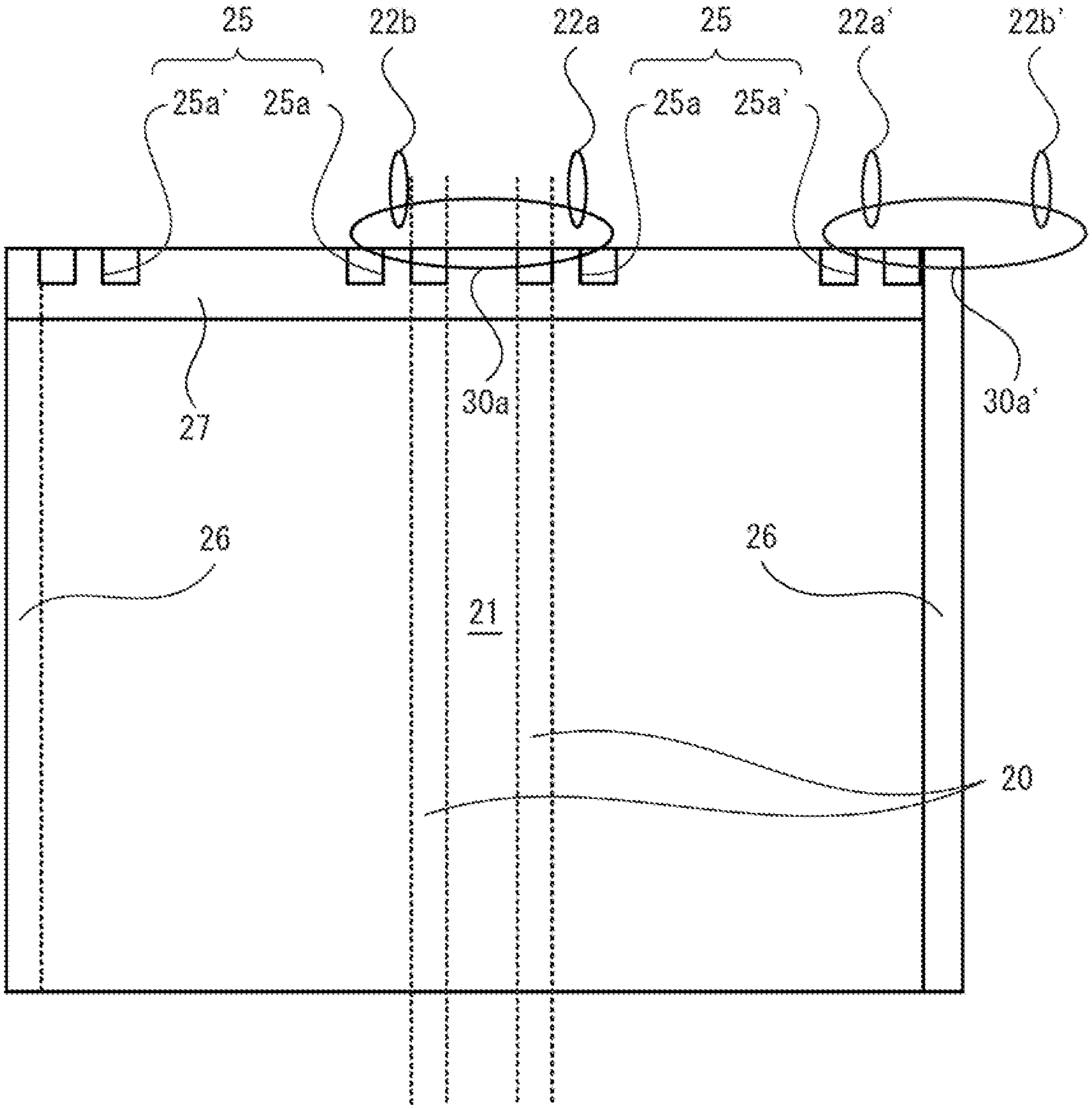
FIG. 7B is a developed view of a covering member of a modification example.

FIG. 7B is a developed view of the covering member 21 of a modification example. The covering member 21 of the modification example differs from the covering member 21 shown in FIG. 7A in that it comprises a cylindrical part 27 formed into a cylindrical shape by folding back the end substantially perpendicular to the direction of extension of the umbilical member 20, and an insertion hole 25 of a predetermined width formed between two notches after cutting two pieces from the cylindrical part 27. More specifically, the covering member 21 of the modification example comprises two pairs of insertion holes 25*a*, 25*a*' having a predetermined width, which are formed between two adjacent notches after cutting out eight pieces from the cylindrical part 27. The relay members 30*a*, 30*a*' are inserted into the pair of insertion holes 25*a*, 25*a*' arranged in the direction perpendicular to the direction of extension of the umbilical member 20.

Specifically, the first relay member 30*a* is inserted into the first pair of insertion holes 25*a*, and the first affixation member 22*a* and the second affixation member 22*b* are inserted into the first relay member 30*a* in one side region R1 of the virtual plane P (refer to FIG. 6) to affix the covering member 21. The second relay member 30*a*' is inserted into the second pair of insertion holes 25*a*', and the third affixation member 22*a*' and the fourth affixation member 22*b*' are inserted into the second relay member 30*a*' in the other side region R2 of the virtual plane P (refer to FIG.

6) to affix the covering member 21. The two pairs of insertion holes 25*a*, 25*a*', the two relay members 30*a*, 30*a*', and the four affixation members 22*a*, 22*b*, 22*a*', 22*b*' are arranged at predetermined intervals at the end of the covering member 21.

In the covering member 21 of the modification example, since the relay member 30 relays between the covering member 21 and the affixation member 22 without tightening the covering member 21, the shape of the covering member 21 can be maintained even if the affixation member 22 is tightened. Specifically, the covering member 21 of the modification example also has the advantage in that it is not likely to inhibit the movement of the umbilical member 20.

It is preferable that the covering member 21 of the modification example comprise the reinforcement parts (not illustrated) described above. Though the reinforcement parts are constructed by laminating a plurality of sheets of cloth or rubber at the end where the insertion holes 25 shown in FIG. 7B are formed, they are not limited thereto, and in other embodiments, the reinforcement parts may be constituted by loop-shaped fittings for reinforcing the insertion holes 25 having a predetermined width. In another embodiment, the reinforcement parts may be constituted by combining these laminated reinforcements and metal reinforcements.

Figure 7C:
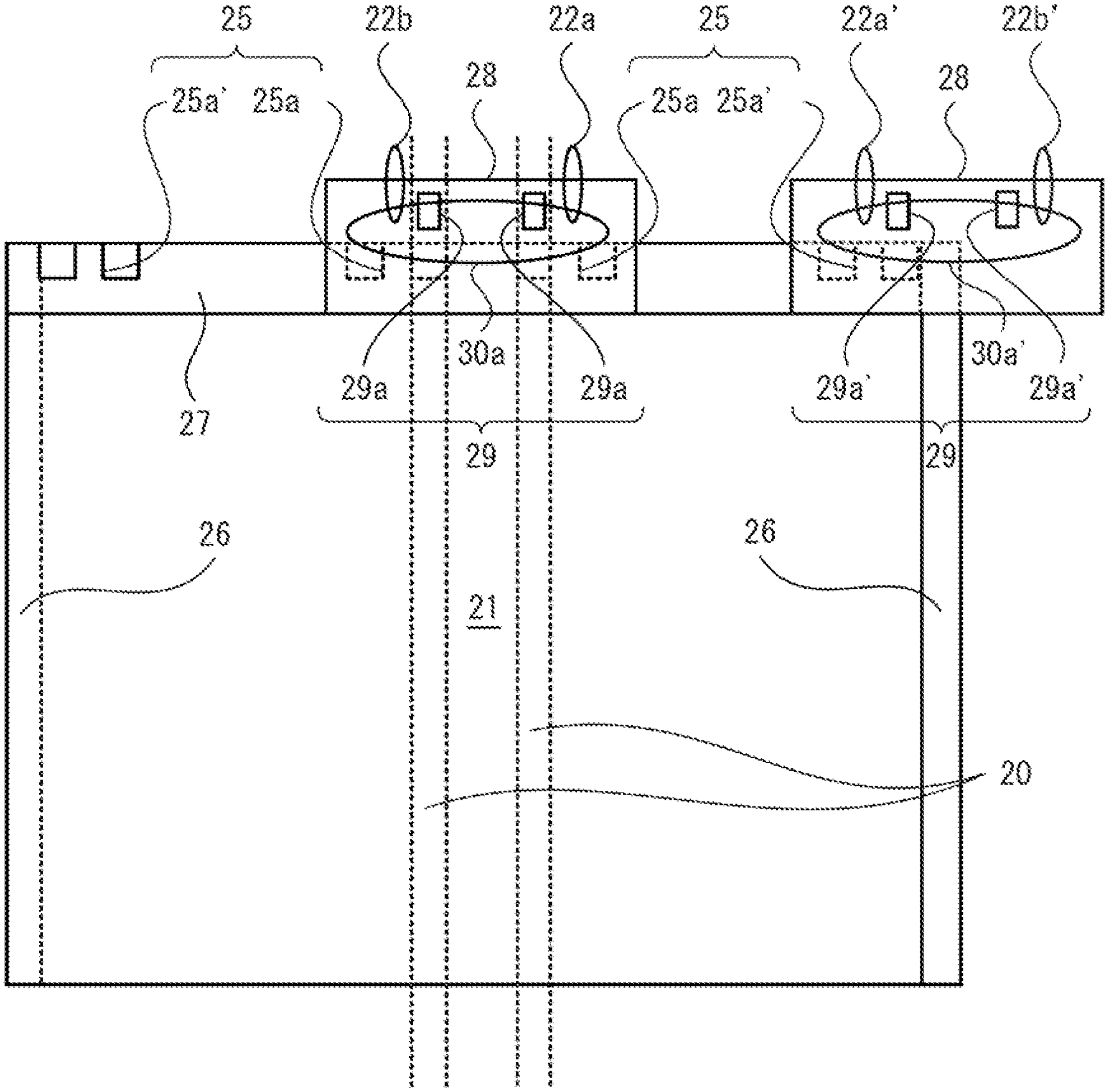
FIG. 7C is a developed view of a covering member of another modification example.

FIG. 7C is a developed view of the covering member 21 of another modification example. Though the covering member 21 of the other modification example has roughly the same configuration as the covering member 21 shown in FIG. 7B, the covering member 21 of the other modification example differs from the covering member 21 shown in FIG. 7B in that it comprises sub-covering parts 28. More specifically, the covering member 21 of the other modification example comprises two sub-covering parts 28 at the end where the insertion holes 25 are formed. Note that in other embodiments, the covering member 21 of the other modification example may comprise one sub-covering part 28 at the end where the insertion holes 25 are formed. In this case, the one sub-covering part 28 preferably extends across the entire end where the insertion holes 25 are formed.

Though the sub-covering parts 28 are a cloth such as a patch cloth, it is not limited thereto, and in other embodiments, the sub-covering parts 28 may be composed of a rubber such as a patch rubber. The sub-covering parts 28 cover the insertion holes 25 and extend outward from the end where the insertion holes 25 are formed. More specifically, the first sub-covering part 28 covers the first pair of insertion holes 25*a* and extends outward from the end where the first pair of insertion holes 25*a* are formed. The second sub-covering part 28 covers the second pair of insertion holes 25*a*' and extends outward from the end where the second pair of insertion holes 25*a*' are formed.

Even if the covering member 21 of the other modification example is pulled downward in the drawing due to bending of the umbilical member 20 or bending and twisting of the umbilical member 20, since the sub-covering parts 28 cover the gap that may be formed between the covering member 21 and the affixed member 23 (refer to FIG. 5), the sub-covering parts 28 has the role of protecting the umbilical member 20 from foreign matter such as spatter and swarf regardless of the operation of the umbilical member 20.

It is preferable that the sub-covering parts 28 comprise sub-insertion holes 29 more outward than the end where the insertion holes 25 are formed. More specifically, the first sub-covering part 28 comprises a first pair of sub-insertion holes 29*a* arranged in a direction perpendicular to the direction of extension of the umbilical member 20. The second sub-covering part 28 comprises a second pair of sub-insertion holes 29*a*' arranged in a direction perpendicular to the direction of extension of the umbilical member 20. The relay members 30*a*, 30*a*' are inserted into the pair of sub-insertion holes 29*a*, 29*a*' arranged in a direction perpendicular to the direction of extension of the umbilical member 20.

Specifically, the first relay member 30*a* is inserted into the first pair of insertion holes 25*a* and the first pair of sub-insertion holes 29*a*, and the first affixation member 22*a* and the second affixation member 22*b* are inserted into the first relay member 30*a* in the one side region R1 of the virtual plane P (refer to FIG. 6) to affix the covering member 21. The second relay member 30*a*' is inserted into the second pair of insertion holes 25*a*' and the second pair of sub-insertion holes 29*a*', and the third affixation member 22*a*' and the fourth affixation member 22*b*' are inserted into the second relay member 30*a*' in the other side region R2 of the virtual plane P (refer to FIG. 6) to affix the covering member 21. The two pairs of insertion holes 25*a*, 25*a*', the two pairs of sub-insertion holes 29*a*, 29*a*', the two relay members 30*a*, 30*a*', and the four affixation members 22*a*, 22*b*, 22*a*', 22*b*' are arranged at predetermined intervals at the end of the covering member 21.

In the covering member 21 of the other modification example, since the relay member 30 is inserted into the insertion holes 25 and the sub-insertion holes 29, and the affixation member 22 is inserted into the relay member 30 and affixed to the affixed member 23 (refer to FIG. 5), the sub-covering parts 28 and the end of the covering member 21 are both affixed to the affixed member 23. As a result, even if the umbilical member 20 bends or the umbilical member 20 bends and twists, since the sub-covering part 28 will not roll up, the covering member 21 of the other modification example has the advantage in that the sub-covering parts 28 protect the umbilical member 20 from foreign matter such as spatter and swarf regardless of the operation of the umbilical member 20.

In the covering member 21 of the other modification example, since the relay member 30 relays between the covering member 21 and the affixation member 22 without tightening the covering member 21, the shape of the covering member 21 can be maintained even if the affixation member 22 is tightened. Specifically, the covering member 21 of the other modification example also has the advantage in that it is unlikely to inhibit the movement of the umbilical member 20.

Figure 8:
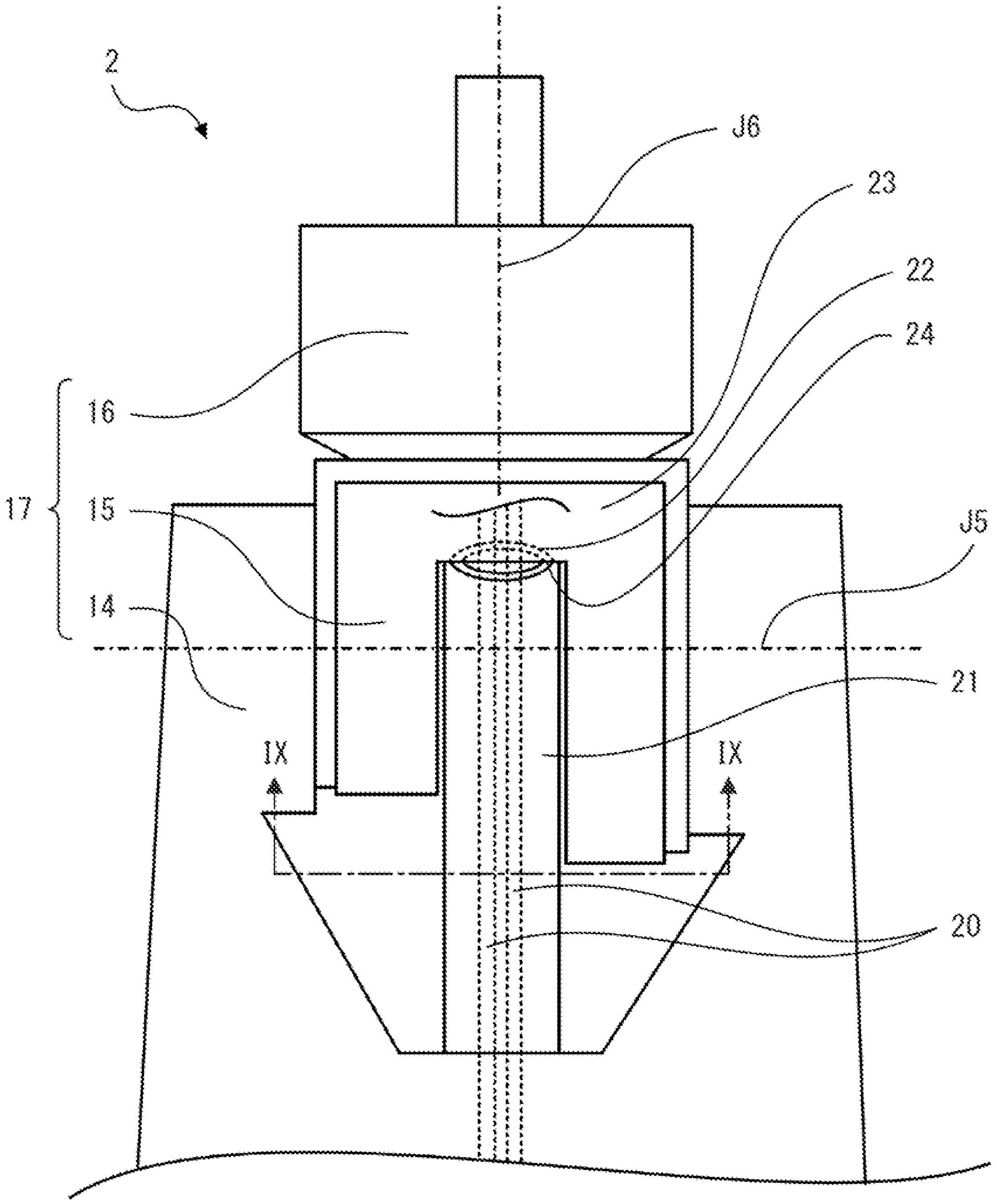
FIG. 8 is a top view of the covering member affixation structure of a third embodiment.

The covering member affixation structure 2 of a third embodiment will be described below. FIG. 8 is a top view of the covering member affixation structure 2 of the third embodiment. The covering member affixation structure 2 of the third embodiment differs from the covering member affixation structure 2 of the first embodiment or the second embodiment in that it comprises an affixation member 22 for affixing the covering member 21 on another virtual plane (not illustrated) substantially parallel to the virtual plane P. The virtual plane P is a plane parallel to the fifth axis line J5 of the machine 1 on which the umbilical member 20 bend and includes the sixth axis line J6 of the machine 1 on which the umbilical member 20 is laid. The fifth axis line J5 is the axis of rotation of the fifth link 15, and the sixth axis line J6 is the axis of rotation of the sixth link 16. The sixth axis line J6 is also the center axis line of the hollow hole 23*a* of the affixed member 23 (or fifth link 15, which is a hollow housing) through which the umbilical member 20 is inserted.

Figure 9:
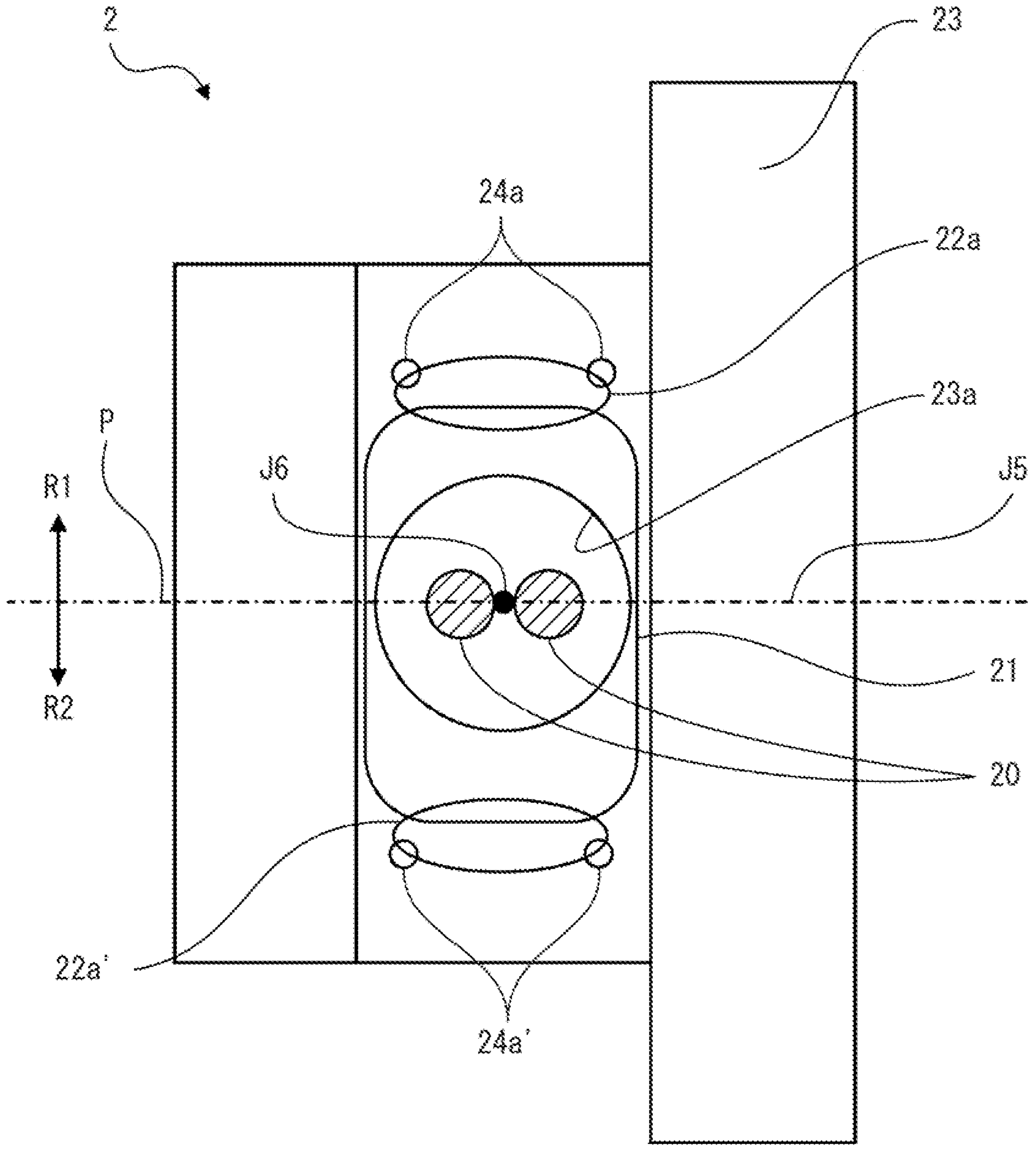
FIG. 9 is a cross-sectional view taken along line IX-IX showing details of the covering member affixation structure of the third embodiment.

FIG. 9 is a cross-sectional view taken along line IX-IX showing details of the covering member affixation structure 2 of the third embodiment. The covering member affixation structure 2 of the third embodiment comprises the covering member 21 for covering the umbilical member 20, and two affixation members 22*a*, 22*a*' for affixing the covering member 21 to the affixed member 23. The covering member affixation structure 2 may further comprise the affixed member 23 to which the covering member 21 is affixed. The affixed member 23 comprises two pairs of through holes 24*a*, 24*a*' arranged on another virtual plane (not illustrated) substantially parallel to the virtual plane P. The affixation members 22*a*, 22*a*' pass through the pair of through holes 24*a*, 24*a*' on the other virtual plane (not illustrated) substantially parallel to the virtual plane P to affix the covering member 21 to the affixed member 23.

Specifically, the first affixation member 22*a* passes through the first pair of through holes 24*a* in the one side region R1 of the virtual plane P to affix the covering member 21. The second affixation member 22*a*' passes through the second pair of through holes 24*a*' in the other side region R2 of the virtual plane P to affix the covering member 21. The first affixation member 22*a* passes through the pair of through holes 24*a* on the other virtual plane (not illustrated) substantially parallel to the virtual plane P to affix the covering member 21 to the affixed member 23. The second affixation member 22*a*' passes through the pair of through holes 24*a*' on the other virtual plane (not illustrated) substantially parallel to the virtual plane P to affix the covering member 21 to the affixed member 23. The two affixation members 22*a*, 22*a*' and the two pairs of through holes 24*a*, 24*a*' are arranged at predetermined intervals around the cylindrical covering member 21.

Figure 10A:
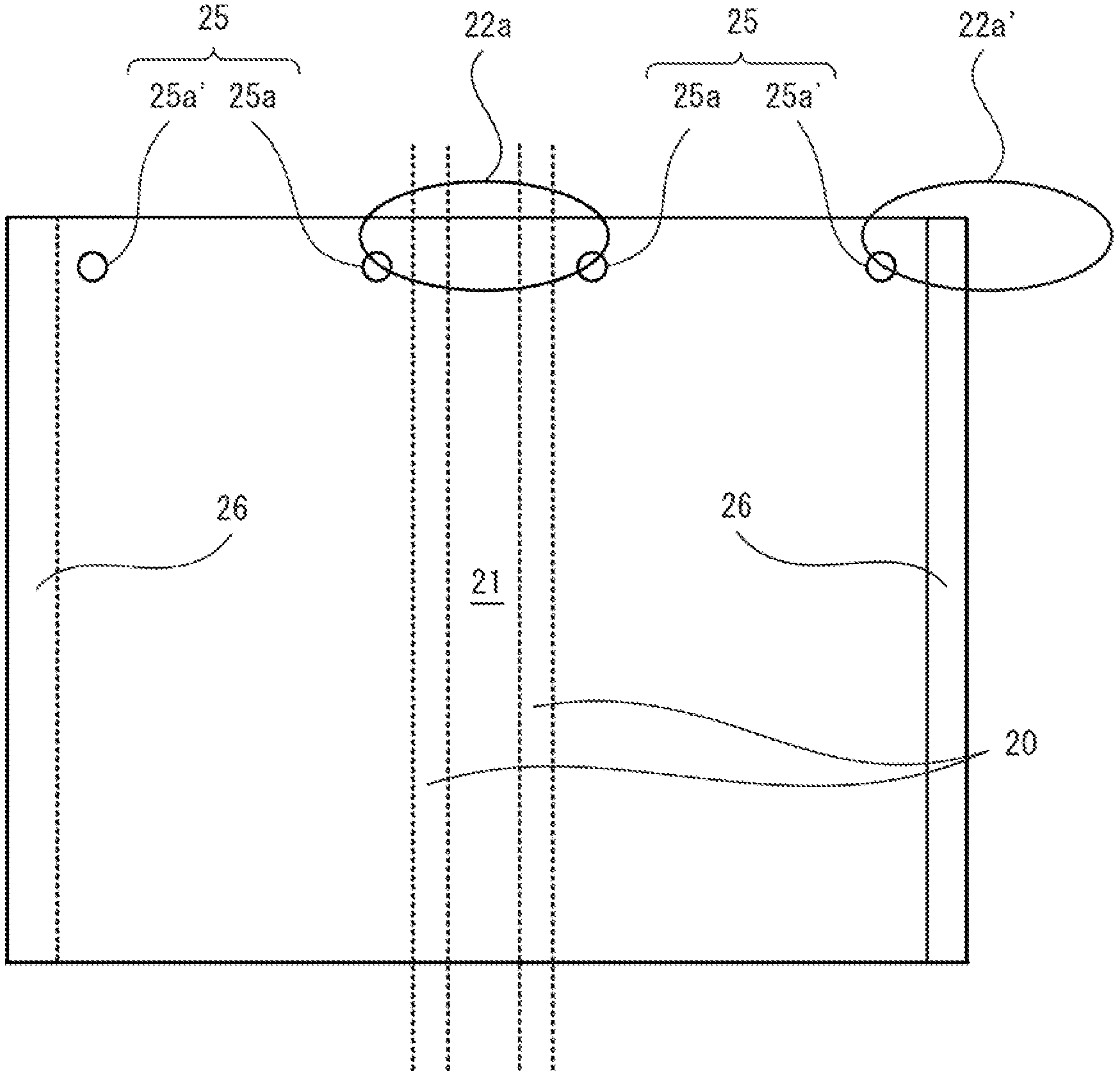
FIG. 10A is a developed view of the covering member of the third embodiment.

FIG. 10A is a developed view of the covering member 21 of the third embodiment. The covering member 21 of the present example is a substantially rectangular cover that unfolds into a sheet-like shape. The covering member 21 comprises a pair of joints 26 on the sides substantially parallel to the direction of extension of the umbilical member 20. One joint 26 is arranged on the front side of the covering member 21, and the other joint 26 is arranged on the back side of the covering member 21. Note that though the joints 26 are hook-and-loop fasteners, they are not limited thereto, and in other embodiments, the joints 26 may be constituted by a zipper or a button. By rolling the covering member 21 into a cylindrical shape, wrapping it around the umbilical member 20, and joining the pair of joints 26, the covering member 21 covers the umbilical member 20.

The covering member 21 comprises insertion holes 25 for the affixation member 22 at the end substantially perpendicular to the direction of extension of the umbilical member 20. More specifically, the covering member 21 of the present example comprises two pairs of insertion holes 25*a*, 25*a*' arranged at the end substantially perpendicular to the direction of extension of the umbilical member 20. The affixation members 22*a*, 22*a*' are inserted into the pair of insertion holes 25*a*, 25*a*' arranged in a direction substantially perpendicular to the direction of extension of the umbilical member 20.

Specifically, the first affixation member 22*a* is inserted into the first pair of insertion holes 25*a* in one side region R1 of the virtual plane P (refer to FIG. 9) to affix the covering member 21. The second affixation member 22*a*' is inserted into the second pair of insertion holes 25*a*' in the other side region R2 of the virtual plane P (refer to FIG. 9) to affix the covering member 21. The two pairs of insertion holes 25*a*, 25*a*' and the two affixation members 22*a*, 22*a*' are arranged at predetermined intervals at the end of the covering member 21.

Referring again to FIG. 9, the first affixation member 22*a* affixes the covering member 21 to the affixed member 23 in one side region R1 of the virtual plane P. The second affixation member 22*a*' affixes the covering member 21 to the affixed member 23 in the other side region R2 of the virtual plane P. In this manner, the affixation member 22 affixes the covering member 21 to the machine 1 in at least one of the one side region R1 and the other side region R2 of the virtual plane P. In particular, the affixation member 22 affixes the covering member 21 to the machine 1 on the radially outer side of the hollow hole 23*a* of the affixed member 23 (or the fifth link 15, which is a hollow housing). Thus, even if the umbilical member 20 bends in accordance with rotation of the fifth link 15 shown in FIG. 8 about the fifth axis line J5, or even if the umbilical member 20 bends about the fifth axis line J5 and twists about the sixth axis line J6 in accordance with rotation of the fifth link 15 shown in FIG. 8 about the fifth axis line J5 and rotation of the sixth link 16 about the sixth axis line J6, the umbilical member 20 does not contact the affixation member 22. Furthermore, since the affixation member 22 does not inhibit the movement of the umbilical member 20 and the umbilical member 20 does not come into sliding contact with the affixation member 22, premature breakage of the umbilical member 20 can be suppressed, whereby the life of the umbilical member 20 can be extended.

In contrast, in the case in which the distance between the umbilical member 20 and the fifth link 15 is short, when the affixation member 22 straddles (crosses) the one side region R1 and the other side region R2 of the virtual plane P, the umbilical member 20 becomes more likely to come into contact with the affixation member 22. In particular, when the machine 1 is a robot, since it is necessary to house the actuators (electric motors, reducers, gears, etc.) of the fifth link 15 and the sixth link 16 and the umbilical member 20 in a limited space, the umbilical member 20 becomes more likely to come into contact with the affixation member 22. Thus, when the umbilical member 20 bends in accordance with rotation of the fifth link 15 about the fifth axis line J5, or when the umbilical member 20 bends about the fifth axis line J5 and twists about the sixth axis line J6 in accordance with rotation of the fifth link 15 about the fifth axis line J5 and rotation of the sixth link 16 about the sixth axis line J6, the umbilical member 20 contacts the affixation member 22. As a result, the affixation member 22 inhibits movement of the umbilical member 20. Furthermore, since the umbilical member 20 comes into sliding contact with the affixation member 22 each time the umbilical member 20 repeats bending or each time the umbilical member 20 repeats bending and twisting, there is a risk that the umbilical member 20 will be prematurely damaged.

According to the covering member affixation structure 2 of the third embodiment, since the number of affixation members 22 is reduced as compared to other embodiments, and the number of through holes 24 of the affixed member 23 is also reduced as compared to other embodiments, the covering member affixation structure 2 of the third embodiment has advantages in terms of production cost and production man-hours.

Referring again to FIG. 10A, even if the covering member 21 of the present example is pulled downward in the drawing by the bending of the umbilical member 20 or bending and twisting of the umbilical member 20, since the affixation member 22 receives the tensile force of the covering member 21 at two points from the pair of insertion holes 25, the affixation member 22 is unlikely to break. Furthermore, there is an advantage in that the covering member 21 of the modification example is unlikely to fall off. In contrast, when the affixation member 22 receives the tensile force of the covering member 21 at one point from the insertion holes 25, the affixation member 22 becomes likely to break, whereby the covering member 21 can easily be torn by the affixation member 22.

Referring again to FIG. 8, when the umbilical member 20 bends or when the umbilical member 20 bends and twists in accordance with the operations of the machine 1 described above, the covering member 21 is pulled by the umbilical member 20 and may move away from the affixed member 23. The covering member 21 preferably comprises reinforcement parts (not illustrated) so that the covering member 21 is not torn by the affixation member 22 when the covering member 21 moves away from the affixed member 23. Though the reinforcement parts are constructed by laminating a plurality of pieces of cloth or rubber at the end where the insertion holes 25 shown in FIG. 10A are formed, they are not limited thereto, and in other embodiments, the reinforcement parts may be constituted by metal fittings such as eyelets for reinforcing the peripheries of the insertion holes 25. In another embodiment, the reinforcement parts may be configured by combining these laminated reinforcements and metal reinforcements.

Figure 10B:
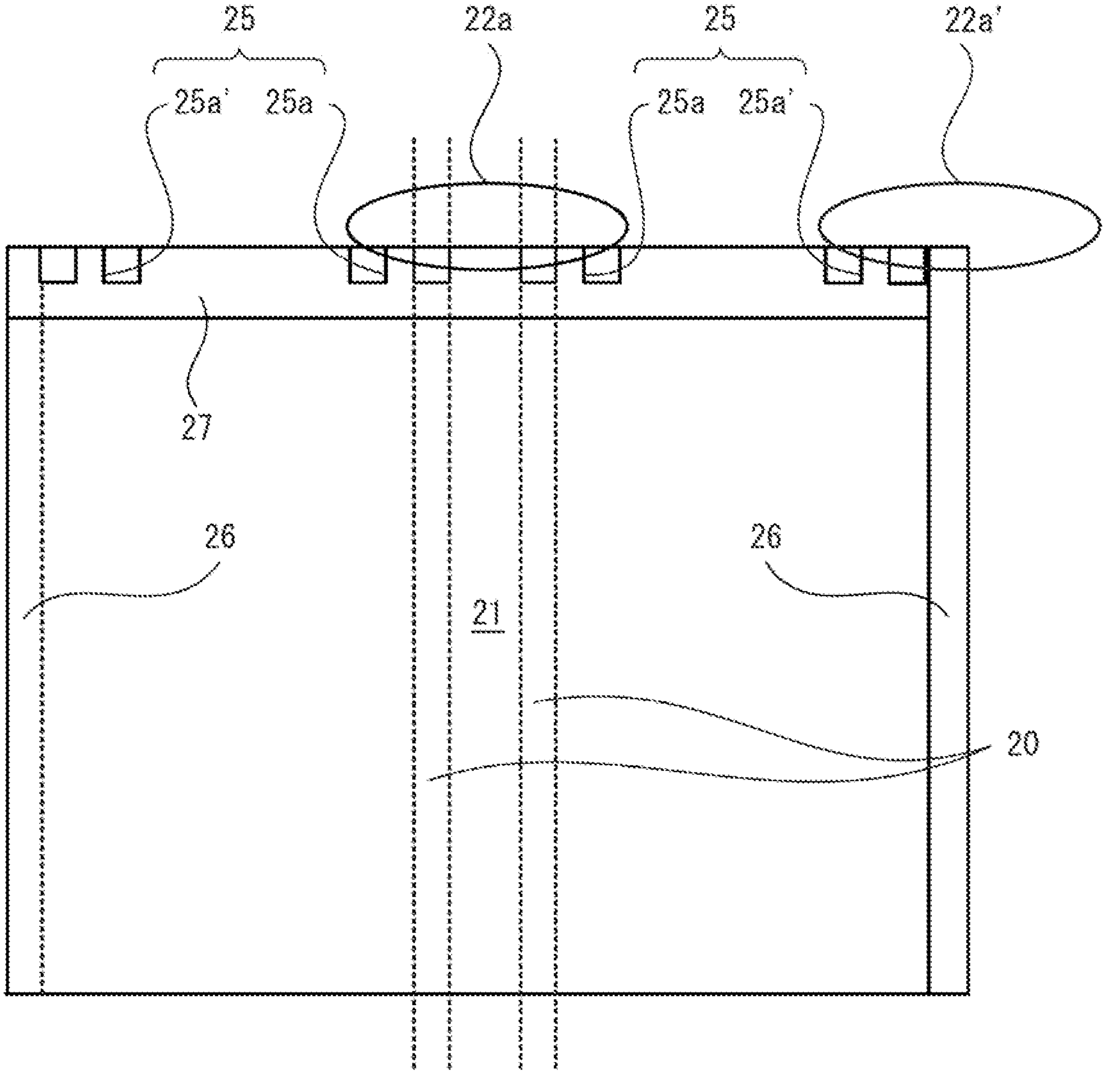
FIG. 10B is a developed view of a covering member of a modification example.

FIG. 10B is a developed view of the covering member 21 of a modification example. The covering member 21 of the modification example differs from the covering member 21 shown in FIG. 10A in that it comprises a cylindrical part 27 formed into a cylindrical shape by folding back the end substantially perpendicular to the direction of extension of the umbilical member 20, and an insertion hole 25 of a predetermined width formed between two notches after cutting two pieces from the cylindrical part 27. More specifically, the covering member 21 of the modification example comprises two pairs of insertion holes **25*a*, 25*a*' having a predetermined width, which are formed between two adjacent notches after cutting out eight pieces from the cylindrical part 27. The affixation members 22*a*, 22*a*' are inserted into the pair of insertion holes 25*a*, 25*a*' in the direction substantially perpendicular to the direction of extension of the umbilical member 20**.

Specifically, the first affixation member **22*a* is inserted into the first pair of insertion holes 25*a* in the one side region R1 of the virtual plane P (refer to FIG. 9) to affix the covering member 21. The second affixation member 22*a*' is inserted into the second pair of insertion holes 25*a*' to affix the covering member 21. The two pairs of insertion holes 25*a*, 25*a*' and the two affixation members 22*a*, 22*a*' are arranged at predetermined intervals at the end of the covering member 21**.

In the covering member 21 of the modification example, since the number of affixation members 22 is reduced as compared to other embodiments, and the number of through holes 24 of the affixed member 23 is also reduced as compared to other embodiments, the covering member affixation structure 2 has advantages in terms of production cost and production man-hours.

Even if the covering member 21 of the modification example is pulled downward in the drawing due to bending of the umbilical member 20 or bending and twisting of the umbilical member 20, since the affixation member 22 receives the tensile force of the covering member 21 in two lines from the pair of insertion holes 25 having a predetermined width, the affixation member 22 is unlikely to break. Furthermore, there is an advantage in that the covering member 21 of the modification example is unlikely to fall off. In contrast, when the affixation member 22 receives the tensile force of the covering member 21 at one point from the insertion holes 25, the affixation member 22 is likely to break.

It is preferable that the covering member 21 of the modification example comprise the reinforcement parts (not illustrated) described above. Though the reinforcement parts are constructed by laminating a plurality of sheets of cloth or rubber at the end where the insertion holes 25 shown in FIG. 10B are formed, they are not limited thereto, and in other embodiments, the reinforcement parts may be constituted by loop-shaped fittings for reinforcing the insertion holes 25 having a predetermined width. In another embodiment, the reinforcement parts may be constituted by combining these laminated reinforcements and metal reinforcements.

Figure 10C:
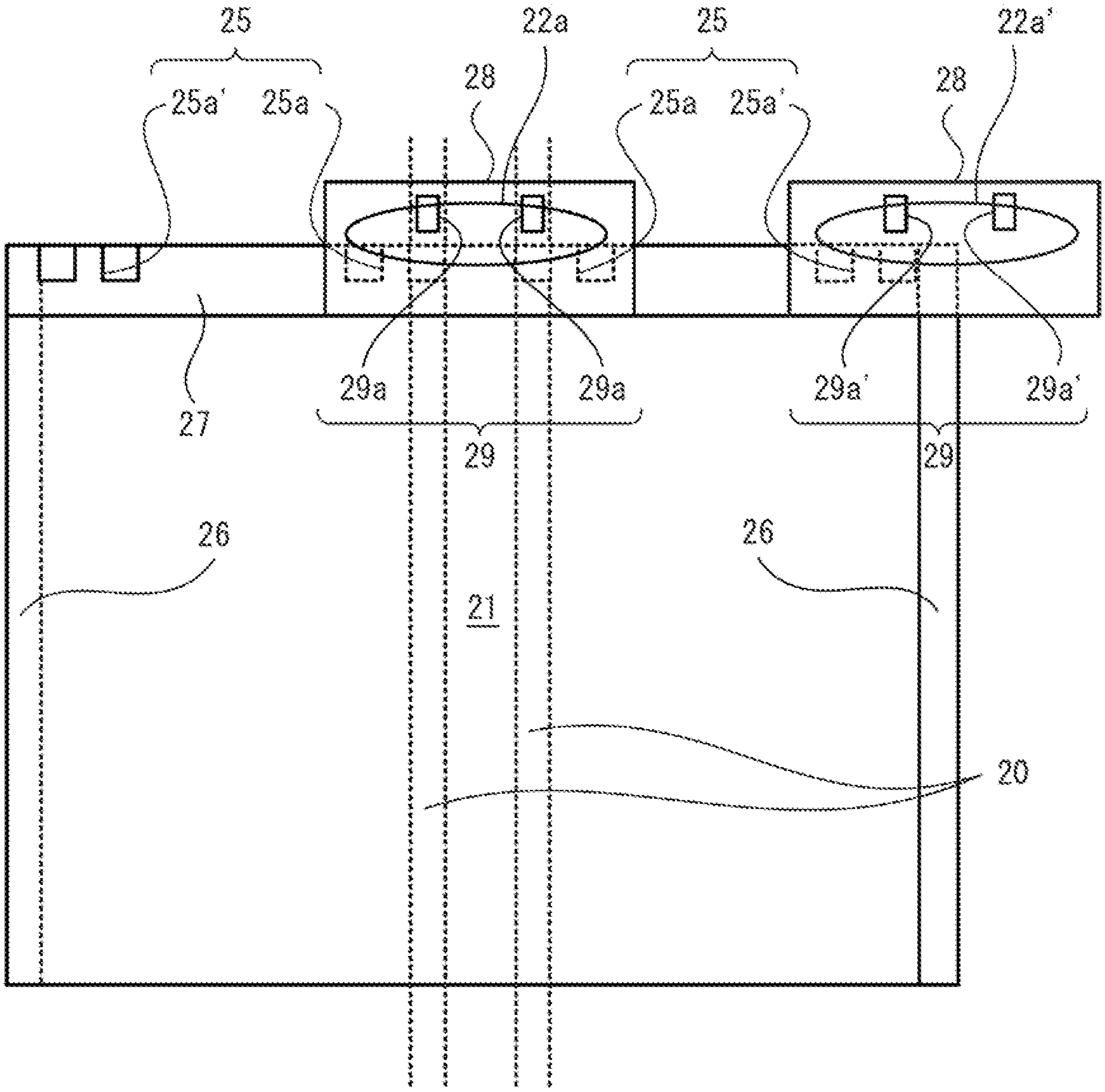
FIG. 10C is a developed view of a covering member of another modification example.

FIG. 10C is a developed view of the covering member 21 of another modification example. Though the covering member 21 of the other modification example has roughly the same configuration as the covering member 21 shown in FIG. 10B, it differs from the covering member 21 shown in FIG. 10B in that it comprises sub-covering parts 28. More specifically, the covering member 21 of the other modification example comprises two sub-covering parts 28 at the end where the insertion holes 25 are formed. Note that in other embodiments, the covering member 21 of the other modification example may comprise one sub-covering part 28 at the end where the insertion holes 25 are formed. In this case, the one sub-covering part 28 preferably extends across the entire end where the insertion holes 25 are formed.

Though the sub-covering parts 28 are a cloth such as patch cloth, they are not limited thereto, and in other embodiments, the sub-covering parts 28 may be constituted by a rubber such as patch rubber. The sub-covering parts 28 cover the insertion holes 25 and extends outward from the end where the insertion holes 25 are formed. More specifically, the first sub-covering part 28 covers the first pair of insertion holes **25*a* and extends outward from the end where the first pair of insertion holes 25*a* are formed. The second sub-covering part 28 covers the second pair of insertion holes 25*a*' and extends outward from the end where the second pair of insertion holes 25*a*'** are formed.

Even if the covering member 21 of the other modification example is pulled downward in the drawing due to bending of the umbilical member 20 or bending and twisting of the umbilical member 20, since the sub-covering parts 28 cover the gap that may be formed between the covering member 21 and the affixed member 23 (refer to FIG. 8), the sub-covering part 28 has the role of protecting the umbilical member 20 from foreign substances such as spatter and swarf regardless of the operation of the umbilical member 20.

Further, it is preferable that the sub-covering parts 28 comprise sub-insertion holes 29 outward from the end where the insertion holes 25 are formed. More specifically, the first sub-covering part 28 comprises a first pair of sub-insertion holes **29*a* arranged in a direction perpendicular to the direction of extension of the umbilical member 20. The second sub-covering part 28 comprises a second pair of sub-insertion holes 29*a*' arranged in a direction perpendicular to the direction of extension of the umbilical member 20. The affixation members 22*a*, 22*a*' are inserted into the pair of sub-insertion holes 29*a*, 29*a*' arranged in a direction perpendicular to the direction of extension of the umbilical member 20**.

Specifically, the first affixation member 22*a* is inserted into the first pair of insertion holes 25*a* and the first pair of sub-insertion holes 29*a* in the one side region R1 of the virtual plane P (refer to FIG. 9) to affix the covering member 21. The second affixation member 22*a*' is inserted into the second pair of insertion holes 25*ba*' and the second pair of sub-insertion holes 29*a*' in the other side region R2 of the virtual plane P (refer to FIG. 9) to affix the covering member 21. The two pairs of insertion holes 25*a*, 25*a*', the two pairs of sub-insertion holes 29*a*, 29*a*', and the two affixation members 22*a*, 22*a*' are arranged at predetermined intervals at the end of the covering member 21.

In the covering member 21 of the other modification example, since the affixation member 22 is inserted into the insertion holes 25 and the sub-insertion holes 29 and affixed to the affixed member 23 (refer to FIG. 8), the sub-covering parts 28 and the end of the covering member 21 are fastened together to the affixed member 23. As a result, even if the umbilical member 20 bends or the umbilical member 20 bends and twists, since the sub-covering part 28 will not roll up, the covering member 21 of the other modification example has the advantage in that the sub-covering parts 28 protect the umbilical member 20 from foreign matter such as spatter and swarf regardless of the operation of the umbilical member 20.

In the covering member 21 of the other modification example, since the number of affixation members 22 is reduced as compared to other embodiments, and the number of through holes 24 of the affixed member 23 is also reduced as compared to other embodiments, the covering member affixation structure 2 has advantages in terms of production cost and production man-hours.

Even if the covering member 21 of the other modification example is pulled downward in the drawing due to bending of the umbilical member 20 or bending and twisting of the umbilical member 20, since the affixation member 22 receives the tensile force of the covering member 21 in two lines from the pair of insertion holes 25 of a predetermined width and at two points from the pair of sub-insertion holes 29, the affixation member 22 is unlikely to break. Furthermore, the covering member 21 of the other modification example has the advantage of being unlikely to fall off. In contrast, when the affixation member 22 receives the tensile force of the covering member 21 at one point from the insertion holes 25, the affixation member 22 becomes likely to break, whereby the covering member 21 becomes likely to be torn by the affixation member 22.

Figure 11:
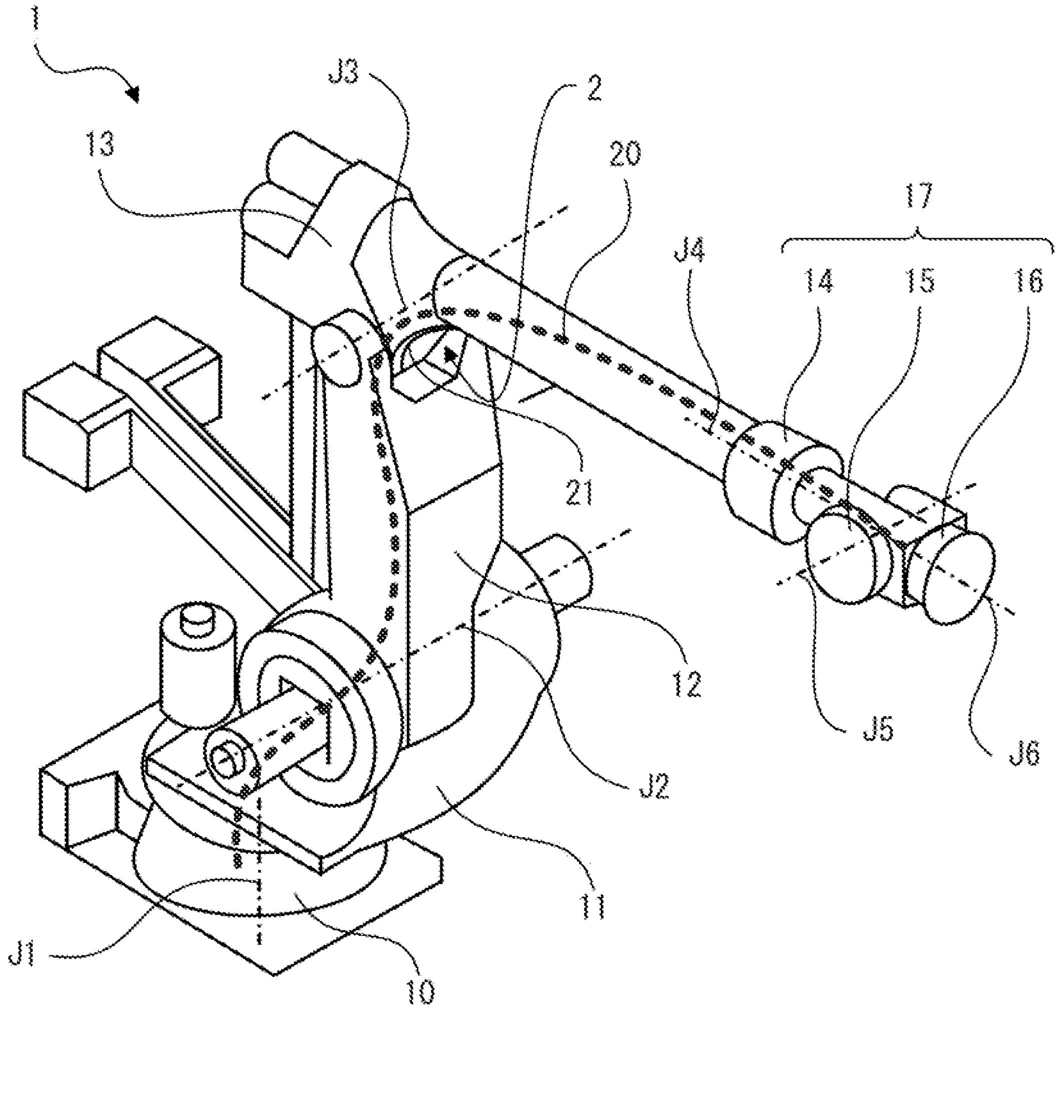
FIG. 11 is a perspective view of another machine comprising the covering member affixation structure of a fourth embodiment.
Figure 12:
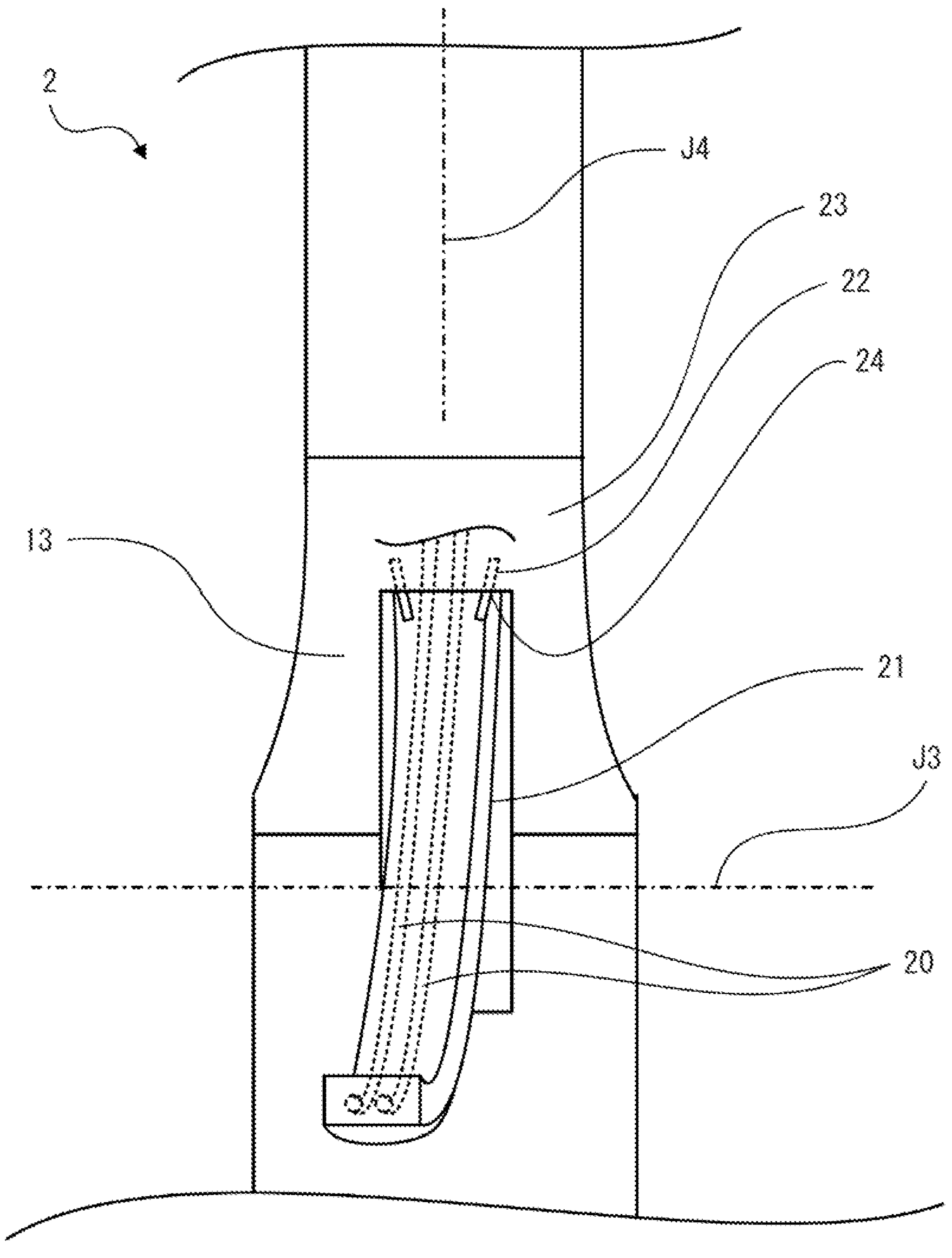
FIG. 12 is a bottom view of the covering member affixation structure of the fourth embodiment.

FIG. 11 is a perspective view of the machine 1 including the covering member affixation structure 2 of a fourth embodiment, and FIG. 12 is a bottom view of the covering member affixation structure 2 of the fourth embodiment. Though the covering member affixation structure 2 of the fourth embodiment is an affixation structure for the covering member 21 for covering the umbilical member 20 laid on the third link 13 (second arm 13), it is not limited thereto, and in other embodiments, the covering member affixation structure 2 may be an affixation structure for the covering member 21 for covering the umbilical member 20 laid on the other links 11 and 12 (rotating trunk 11 and first arm 12).

Though the covering member 21 covers the exposed part of the umbilical member 20 entering the interior of the third link 13 from the outside of the second link 12, it is not limited thereto, and in other embodiments, the covering member 21 may cover the umbilical member 20 laid from the outside of the second link 12 to the outside of the third link 13, as long as the movement of the umbilical member 20 is not restricted, or it may cover the umbilical member 20 laid from the inside of the second link 12 to the outside of the third link 13. Though the covering member 21 and the affixation member 22 are configured as separate members, they are not limited thereto, and in other embodiments, the covering member 21 and the affixation member 22 may be configured as a single integrated member.

The covering member affixation structure 2 may further comprise the affixed member 23 to which the affixation member 22 is affixed. Note that though the affixed member 23 is composed of the cast third link 13 itself, it is not limited thereto, and it may be a protective cover for the third link 13, as described in the previous embodiment. Though the affixed member 23 is a flexible protective cover such as a resin cover having a smooth surface, it is not limited thereto, and in other embodiments, the affixed member 23 may be composed of a flexible protective cover having a smooth surface such as a lightweight metal cover. The affixed member 23 comprises a pair of through holes 24 (refer to FIG. 3) through which the ring-shaped affixation member 22 passes. The other configurations are the same as those described in the first to third embodiments.

According to the various embodiments described above, the affixation member 22 does not straddle (does not cross) the one side region R1 and the other side region R2 of the virtual plane P parallel to the first axis line of the machine 1 where the umbilical member 20 bends and including the second axis line of the machine 1 on which umbilical member 20 is laid. Thus, even if the umbilical member 20 bends in accordance with movement of the machine 1 along the first axis line, or bends and twists in accordance with movement of the machine along the first axis line and the second axis line, the umbilical member 20 does not come into contact with the affixation member 22. Furthermore, since the affixation member 22 does not inhibit the movement of the umbilical member 20 and the umbilical member 20 does not come into sliding contact with the affixation member 22, premature breakage of the umbilical member 20 can be suppressed, whereby the life of the umbilical member 20 can be extended.

Though various embodiments have been described in the present description, the present invention is not limited to the embodiments described above, and various changes can be made within the scope described in the claims.

REFERENCE SIGNS LIST

1 machine (robot)
2 covering member affixation structure
10 base
11 first link (rotating trunk)
12 second link (first arm)
13 third link (second arm)
14 fourth link (first wrist element)
15 fifth link (second wrist element)
16 sixth link (third wrist element)
17 wrist unit
20 umbilical member
21 covering member
22, 22*a*, 22*b*, 22*a*', 22*b* affixation member
23 affixed member
23*a* hollow hole
24, 24*a*, 24*b*, 24*a*', 24*b*' through hole
25, 25*a*, 25*b*, 25*a*', 25*b*' insertion hole
26 joint
27 cylindrical part
28 sub-covering part
29, 29*a*, 29*b*, 29*a*', 29*b*' sub-insertion hole

30, 30*a*, 30*a*' relay member
J1 to J6 axis line
P virtual plane
R1 one side region
R2 other side region

The invention claimed is:

1. A covering member affixation structure, comprising:
- a covering member for covering an exposed part of an umbilical member laid in a machine, and
- a plurality of affixation members for affixing the covering member to the machine in one side region and another side region of a virtual plane which is parallel to a first axis line of the machine where the umbilical member bends and which includes a second axis line of the machine along which the umbilical member is laid,
- wherein the covering member is a cylindrical shape rolled from a rectangular sheet,
- wherein a first set of through holes and a second set of through holes, which is opposed to the first set of through holes, are formed only on one end of the cylindrical covering member,
- wherein a first set of affixation members of the plurality of affixation members passes through the first set of through holes of the covering member and one side region through holes formed on the machine in the one side region,
- wherein a second set of affixation members of the plurality of affixation members passes through the second set of through holes of the covering member and another side region through holes formed on the machine in the another side region, and
- wherein the umbilical member is interposed between a combination of the first set of affixation members and the first set of through holes and a combination of the second set of affixation members and the second set of through holes.

2. The covering member affixation structure according to claim 1, wherein the machine comprises a hollow housing into which the umbilical member is inserted, and the second axis line is a center axis line of a hollow hole of the hollow housing.

3. The covering member affixation structure according to claim 1, wherein the machine comprises a hollow housing into which the umbilical member is inserted, and the affixation member affixes the covering member to the machine on the radially outer side of a hollow hole of the hollow housing.

4. The covering member affixation structure according to claim 1, wherein the umbilical member has an exposed part which is exposed to the outside of the machine, and the covering member covers only the exposed part of the umbilical member.

5. The covering member affixation structure according to claim 1, wherein the covering member comprises an insertion hole in an end substantially perpendicular to a direction of extension of the umbilical member, and the affixation member is inserted into the insertion hole in at least one region of one side region and another side region of the virtual plane to affix the covering member to the machine.

6. The covering member affixation structure according to claim 1, wherein the covering member comprises an insertion hole formed in an end substantially perpendicular to a direction of extension of the umbilical member, and a reinforcement part for reinforcing the insertion hole.

7. The covering member affixation structure according to claim 1, wherein the covering member comprises a cylindrical part formed into a cylindrical shape by folding back an end substantially perpendicular to a direction of extension of the umbilical member, and an insertion hole having a predetermined width formed between two notches after cutting two pieces from the cylindrical part.

8. The covering member affixation structure according to claim 1, wherein the covering member comprises an insertion hole formed in an end substantially perpendicular to a direction of extension of the umbilical member, and a sub-covering part which covers the insertion hole and which extends outward from the end where the insertion hole is formed.

9. The covering member affixation structure according to claim 8, wherein the sub-covering part comprises a sub-insertion hole more outside from the end where the insertion hole is formed, and the affixation member is inserted into the insertion hole and the sub-insertion hole in at least one region of one side region and another side region of the virtual plane to affix the covering member.

10. The covering member affixation structure according to claim 1, wherein the affixation member affixes the covering member on another virtual plane which is substantially perpendicular to the virtual plane or on another virtual plane that is substantially parallel to the virtual plane.

11. A machine comprising the covering member affixation structure according to claim 1.

12. A robot comprising the covering member affixation structure according to claim 1.

* * * * *